(12) United States Patent
Wecker et al.

(10) Patent No.: US 6,256,614 B1
(45) Date of Patent: Jul. 3, 2001

(54) INTERNET SYSTEM FOR PRODUCING ELECTRONIC REWARD CARDS

(76) Inventors: Jeff H. Wecker, 475 Laurel Ave., Highland Park, IL (US) 60035; Anthony R. Carpenterie, 25 Burad St., Forest Hills, NY (US) 11375; John Mack, 281 Stanford Pl., Newtown, PA (US) 18940

( * ) Notice: Subject to any disclaimer, the term of this patent is extended or adjusted under 35 U.S.C. 154(b) by 0 days.

(21) Appl. No.: 09/358,352

(22) Filed: Jul. 21, 1999

Related U.S. Application Data

(63) Continuation-in-part of application No. 09/060,783, filed on Apr. 15, 1998.
(60) Provisional application No. 60/093,958, filed on Jul. 24, 1998, provisional application No. 60/060,783, filed on Apr. 15, 1998, provisional application No. 60/048,416, filed on Jun. 3, 1997, and provisional application No. 60/043,721, filed on Apr. 17, 1997.

(51) Int. Cl.[7] .................................................. G06F 17/60
(52) U.S. Cl. ........................... 705/14; 705/72; 705/41
(58) Field of Search ................................ 705/10, 14, 15, 705/16, 25, 26, 27

(56) References Cited

U.S. PATENT DOCUMENTS

| | | | |
|---|---|---|---|
| 5,710,886 | * | 1/1998 | Christensen et al. .............. 705/14 |
| 5,749,075 | * | 5/1998 | Toader et al. .................... 705/14 |
| 5,893,075 | * | 4/1999 | Plainfield et al. ................ 705/14 |
| 5,893,098 | * | 4/1999 | Peters et al. ..................... 707/3 |
| 6,014,634 | * | 1/2000 | Scroggie et al. ................. 705/14 |

FOREIGN PATENT DOCUMENTS

2345171 * 6/2000 (GB) ........................... G06F/17/60

OTHER PUBLICATIONS

Corcoran, Judy, A Multipurpose product: There's more to phone cards than long distance; here are some other ways cards are being used, Apr. 15, 1996, Supermarket News, v46, p45.*

Mohan, Suruchi, "Free Mail on the Net forces users to trade off privacy," Computerworld, v. 29, N.48, p. 6, Nov. 27, 1995.*

Sarah Stambler's Marketing with Technology News, "AOL Market Research Venture," v. 4, N. 12, Aug. 25, 1995.*

* cited by examiner

Primary Examiner—James P. Trammell
Assistant Examiner—Daniel Lastra
(74) Attorney, Agent, or Firm—Russell E Hattis

(57) ABSTRACT

A system to build and provide an immediate electronic reward to a consumer's PC, Web-TV, Pager (or other electronic media) in return for some action taken by the consumer on the Internet. Typically the reward is manifested in the image of an Electronic Phone Card that contains free long distance calling minutes. The amount of the reward and the nature of the accompanying marketing message (printed and audio) are built in real time according to the consumer's actions or answers to survey questions on the Internet, thus making this an "intelligent" system. Free long distance calling may be added to an existing card or may be delivered in the form of a new card.

29 Claims, 20 Drawing Sheets

FIG. 1A

IMMEDIATE GRATIFICATION IS ONLY A
CLICK AWAY...

 FREE LONG DISTANCE MINUTES? REALLY?

CLICK HERE 

FIG. 1B

IMMEDIATE GRATIFICATION IS ONLY A
CLICK AWAY...

THANK YOU FOR YOUR INTEREST IN THE EPC REWARD SYSTEM. TO USE THE EPC DEMO, YOU WILL NEED A USER ID AND PASSWORD. ONCE YOU HAVE ENTERED THE DEMO, COMPLETE THE SURVEY TO RECEIVE YOUR ELECTRONIC PHONE CARD.

IMPORTANT! IF YOU WANT TO TEST SEVERAL TIMES YOU MUST DO THE FOLLOWING:

[ ] RESTART THE PROGRAM FROM THE LOG-IN SCREEN (MAIN.HTM).
[ ] ENTER A UNIQUE E-MAIL ADDRESS.

IF YOU HAVE ANY QUESTIONS REGARDING THIS DEMO, PLEASE CONTACT TONY CARPENTIERE OR STEPHEN PLOTSKER AT
1 (800) 594-4546 OR BY E-MAIL.

CLICK HERE 

FIG. 1C

PLEASE ENTER A VALID USER NAME AND PASSWORD

USER NAME [ GUEST ]

PASSWORD [ *** ]

( SUBMIT ) ( CLEAR )

---

TO ADD MINUTES TO YOUR EXISTING PHONE CARD, ENTER YOUR PIN NUMBER AND CLICK THE SUBMIT BUTTON:     ENTER PIN HERE: [      ]

IF YOU ARE RECEIVING A NEW CARD, FOR THE FIRST TIME, ENTER YOUR NAME, E-MAIL ADDRESS AND CLICK THE SUBMIT BUTTON:    NAME: [      ]

E-MAIL ADDRESS: [      ]

FIG. 1D

PLEASE COMPLETE THE FOLLOWING FORM TO RECEIVE YOUR

| COMPLIMENTARY CALLING CARD AND FREE INFO KIT. |

ARE YOU A:

⦿ PATIENT
○ FRIEND OR LOVED ONE
  OR ARE YOU A HEALTH CARE PROFESSIONAL
○ DOCTOR
○ NURSE
○ PHARMACIST
○ ADMINISTRATOR ( SUBMIT ) ( CLEAR )

FIG. 1E

PLEASE COMPLETE THE FOLLOWING FORM TO RECEIVE YOUR

| COMPLIMENTARY CALLING CARD AND FREE INFO KIT. |
|---|

FIRST NAME:

LAST NAME:

STREET ADDRESS

CITY        STATE    ZIPCODE

E-MAIL ADDRESS

GENDER
○ MALE ○ FEMALE

AGE
[ 25-3 ]

DO YOU CURRENTLY HAVE HIGH CHOLESTEROL?
○ YES ○ NO ○ DON'T KNOW

HAS YOUR HEALTH CARE PROVIDER ENCOURAGED YOU TO TAKE ANY MEDICATION TO REDUCE CHOLESTEROL?
○ YES ○ NO ○ DON'T KNOW

DO YOU PLAN TO VISIT YOUR HEALTHCARE PROVIDER?
○ YES ○ NO

WOULD YOU LIKE ADDITIONAL INFORMATION ABOUT ALLASTATIN?
○ YES ○ NO ( SUBMIT ) ( CLEAR )

FIG. 1F

PLEASE COMPLETE THE FOLLOWING FORM TO RECEIVE YOUR

| COMPLIMENTARY CALLING CARD AND FREE INFO KIT. |
|---|

FIRST NAME:
| JEFF |

LAST NAME:
| WECKER |

STREET ADDRESS
| 475 LAUREL |

| CITY | STATE | ZIPCODE |
| HIGHLAND PARK | IL | 60035 |

E-MAIL ADDRESS
| RWECKER679@AOL.COM |

GENDER
⦿ MALE ○ FEMALE

AGE
| 45-5 |

DO YOU CURRENTLY HAVE HIGH CHOLESTEROL?
○ YES ⦿ NO ○ DON'T KNOW

HAS YOUR HEALTH CARE PROVIDER ENCOURAGED YOU TO TAKE ANY MEDICATION TO REDUCE CHOLESTEROL?
○ YES ⦿ NO ○ DON'T KNOW

DO YOU PLAN TO VISIT YOUR HEALTHCARE PROVIDER?
⦿ YES ○ NO

WOULD YOU LIKE ADDITIONAL INFORMATION ABOUT ALLASTATIN?
⦿ YES ○ NO ( SUBMIT )  ( CLEAR )

FIG. 1G

OUR RECORDS INDICATE THAT YOU HAVE SUBMITTED OUR SURVEY BEFORE AND WE THANK YOU FOR YOUR INTEREST IN ALLASTATIN.

FIG. 1H

PLEASE COMPLETE THE FOLLOWING FORM TO RECEIVE YOUR

| COMPLIMENTARY CALLING CARD AND FREE INFO KIT. |
|---|

ARE YOU A:

○ PATIENT
○ FRIEND OR LOVED ONE
 OR ARE YOU A HEALTH CARE PROFESSIONAL
● DOCTOR
○ NURSE
○ PHARMACIST
○ ADMINISTRATOR

[SUBMIT] [CLEAR]

FIG. 1I

PLEASE COMPLETE THE FOLLOWING FORM TO RECEIVE YOUR

| COMPLIMENTARY CALLING CARD AND FREE INFO KIT. |
|---|

DEA NO. [ 12345234 ]

FIRST NAME:
[ JOHN ]

LAST NAME:
[ DOE ]

STREET ADDRESS
[ 1234 XYZ ST ]

| CITY | STATE | ZIPCODE |
|---|---|---|
| NEW YORK | NY | 10010 |

E-MAIL ADDRESS
[ JOHN@AOL.COM ]

GENDER ● MALE ○ FEMALE

AGE [ 45-5 ]

DO YOU PRESCRIBE / RECOMMEND MEDICATION TO LOWER CHOLESTEROL?
● YES ○ NO

WOULD YOU LIKE ADDITIONAL INFORMATION ABOUT ALLASTATIN?
● YES ○ NO

[SUBMIT] [CLEAR]

FIG. 1J

PLEASE COMPLETE THE FOLLOWING FORM TO RECEIVE YOUR

| COMPLIMENTARY CALLING CARD AND FREE INFO KIT. |
|---|

PLEASE INDICATE THE MEDICATION RECOMMENDED BY YOU / BY YOUR HEALTH CARE PROVIDER

- ○ COLESTID
- ◉ ESTROGEN REPLACEMENT THERAPY
- ○ LESCOL
- ○ LOPID
- ○ MEVACOR
- ○ NIACIN
- ○ ALLASTATIN
- ○ QUESTRAN
- ○ OTHER ( SUBMIT )  ( CLEAR )

FIG. 1K

Thank you for your response to our survey.

Allastatin is the only cholesterol-lowering drug of its kind proven to help prevent a first heart attack in patients with elevated cholesterol despite the absence of symptoms.

Allastatin
pravastatin sodium

To receive free Allastatin starter kits for your patients, contact your Allastatin representative or call 1-800-555-1234.

| 20 free minutes | To place a call from any touch tone phone:<br>1. Dial 1-800-239-7956. Wait.<br>2. At the prompt, enter your PIN number:<br>        1234-567-678<br>3. Dial the area code and number you wish to call. |
|---|---|

COMPLIMENTARY CALLING CARD

Note: This image is for a person receiving a new phone card. If free calling minutes were being added to an existing card, the message would be that "x minutes have been added to your card."

Note: In some cases, only the 800# shows on the screen and the PIN # is E-Mailed. By only E-Mailing one PIN per E-Mail address, some measure of security is maintained.

FIG. 1L

PLEASE COMPLETE THE FOLLOWING FORM TO RECEIVE YOUR

COMPLIMENTARY CALLING CARD AND FREE INFO KIT.

ARE YOU A:
- ⦿ PATIENT
- ○ FRIEND OR LOVED ONE

OR ARE YOU A HEALTH CARE PROFESSIONAL
- ○ DOCTOR
- ○ NURSE
- ○ PHARMACIST
- ○ ADMINISTRATOR

[SUBMIT]  [CLEAR]

FIG. 1M

PLEASE COMPLETE THE FOLLOWING FORM TO RECEIVE YOUR

COMPLIMENTARY CALLING CARD AND FREE INFO KIT.

FIRST NAME:
| KATHY |

LAST NAME:
| LEE |

STREET ADDRESS
| 1568 WEST ST. |

| CITY | STATE | ZIPCODE |
| NEW YORK | NY | 10019 |

E-MAIL ADDRESS
| KATHY@AOL.COM |

GENDER  ○ MALE  ⦿ FEMALE

AGE  | 25-3 |

DO YOU CURRENTLY HAVE HIGH CHOLESTEROL?
⦿ YES  ○ NO  ○ DON'T KNOW

HAS YOUR HEALTH CARE PROVIDER ENCOURAGED YOU TO TAKE ANY MEDICATION TO REDUCE CHOLESTEROL?
⦿ YES  ○ NO  ○ DON'T KNOW

DO YOU PLAN TO VISIT YOUR HEALTHCARE PROVIDER?
⦿ YES  ○ NO

WOULD YOU LIKE ADDITIONAL INFORMATION ABOUT ALLASTATIN?
⦿ YES  ○ NO

[SUBMIT]  [CLEAR]

FIG. 1N

PLEASE COMPLETE THE FOLLOWING FORM TO RECEIVE YOUR

| COMPLIMENTARY CALLING CARD AND FREE INFO KIT. |

PLEASE INDICATE THE MEDICATION RECOMMENDED BY YOU / BY YOUR HEALTH CARE PROVIDER

- ○ COLESTID
- ○ ESTROGEN REPLACEMENT THERAPY
- ○ LESCOL
- ○ LOPID
- ○ MEVACOR
- ○ NIACIN
- ● ALLASTATIN
- ○ QUESTRAN
- ○ OTHER ( SUBMIT )  ( CLEAR )

FIG. 1O

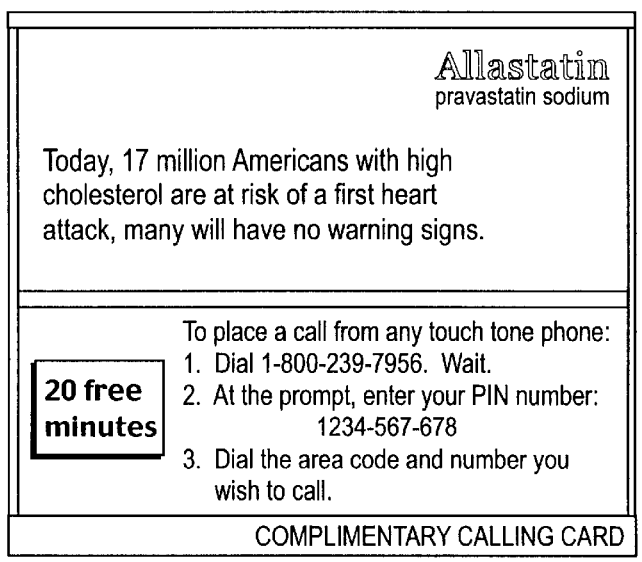

Note: This image is for a person receiving a new phone card. If free calling minutes were being added to an existing card, the message would be that "x minutes have been added to your card."

Note: In some cases, only the 800# shows on the screen and the PIN # is E-Mailed. By only E-Mailing one PIN per E-Mail address, some measure of security is maintained.

FIG. 1P

PLEASE COMPLETE THE FOLLOWING FORM TO RECEIVE YOUR

| COMPLIMENTARY CALLING CARD AND FREE INFO KIT. |

ARE YOU A:
- ○ PATIENT
- ● FRIEND OR LOVED ONE
 OR ARE YOU A HEALTH CARE PROFESSIONAL
- ○ DOCTOR
- ○ NURSE
- ○ PHARMACIST
- ○ ADMINISTRATOR ( SUBMIT )  ( CLEAR )

FIG. 1Q

PLEASE COMPLETE THE FOLLOWING FORM TO RECEIVE YOUR

| COMPLIMENTARY CALLING CARD AND FREE INFO KIT. |
|---|

FIRST NAME:

| JOY |
|---|

LAST NAME:

| ARROWSMITH |
|---|

STREET ADDRESS

| 1234 WEST 8TH ST |
|---|

| CITY | STATE | ZIPCODE |
|---|---|---|
| NEW YORK | NY | 10010 |

E-MAIL ADDRESS

| JOY@AOL.COM |
|---|

GENDER

○ MALE ⦿ FEMALE

AGE

| 25-3 | |
|---|---|

DO YOU CURRENTLY HAVE HIGH CHOLESTEROL?

○ YES ○ NO ⦿ DON'T KNOW

HAS YOUR HEALTH CARE PROVIDER ENCOURAGED YOU TO TAKE ANY MEDICATION TO REDUCE CHOLESTEROL?

○ YES ○ NO ⦿ DON'T KNOW

DO YOU PLAN TO VISIT YOUR HEALTH CARE PROVIDER?

○ YES ○ NO

WOULD YOU LIKE ADDITIONAL INFORMATION ABOUT ALLASTATIN?

⦿ YES ○ NO ( SUBMIT ) ( CLEAR )

FIG. 1R

FORM ENTRIES INCOMPLETE OR INVALID

ONE OR MORE PROBLEMS EXIST WITH THE DATA YOU HAVE ENTERED.
  •PLEASE MENTION IF YOU ARE PLANNING TO VISIT YOUR HEALTH CARE PROVIDER

USE THE BACK BUTTON ON YOUR WEB BROWSER TO RETURN TO THE PREVIOUS PAGE AND CORRECT THE LISTED PROBLEMS.

Note: In some cases, only the 800# shows on the screen and the PIN # is E-Mailed. By only E-Mailing one PIN per E-Mail address, some measure of security is maintained.

Note: This image is for a person receiving a new phone card. If free calling minutes were being added to an existing card, the message would be that "x minutes have been added to your card."

INTERNET SYSTEM FOR PRODUCING ELECTRONIC REWARD CARDS

RELATED APPLICATIONS

This application is based on and is a continuation-in-part of Provisional application Ser. No. 60/093,958, filed Jul. 24, 1998. Provisional application Ser. No. 60/093,958 is, in turn, a continuation-in-part of U.S. application Ser. No. 09/060, 783, filed Apr. 15, 1998, based on provisional Application Ser. Nos. 60/043,721, filed Apr. 17, 1997 and 60/048,416 filed Jun. 3, 1997.

BACKGROUND OF THE INVENTION

1. Field of the Invention

This improvement invention relates to the unique use of an Internet System in rewarding Web Site visitors who access a Web Site, with a reward of an electronic free telephone calling card (or other electronic reward debit card) or adding free long distance calling minutes to an existing calling card, or adding value to another type of existing debit card. A subset of the Electronic Phone Card System allows important and personally tailored healthcare messages to be automatically delivered to patients via E-Mail based upon information the patient supplied when visiting a particular web site. An individual's unique E-mail address is used in a security function to prevent system abuse (ie: multiple requests for a reward by one individual).

2. Description of Prior Art

Phone Cards have been in use for several years now. The cards are generally either sold to the public through retail outlets (ie: 7-Eleven, etc:) or given away by businesses as a promotional tool. One of the applicants has been engaged in this business for the past three years. Although phone cards and the Internet have both been in existence for several years, no one, prior to this invention, has seen how to tie the two together, while expanding the capabilities of both.

One of the problems with the current distribution of phone cards is that consumers have to wait to receive their cards (rewards) by mail. Occasionally consumers (after purchasing a product) have to mail in UPCs and wait 6–8 weeks to receive a card. Or consumers might perform some other function such as taking a survey, participating in a focus group, etc: and still have to wait several weeks for their phone card to be mailed to them. This delay tends to have a detrimental effect on the whole promotion. The present invention eliminates this "delay" problem and solves many others (described in the Summary of the Invention).

U.S. Pat. Nos. 5,128,752, 5,368,125 and 4,850,007 are examples of immediate reward systems not involving phone card rewards or other features of the invention to be described.

SUMMARY OF THE INVENTION

The present invention is an improvement on the Electronic Free Calling Card or other electronic debit card reward which is generated by an Internet System for collecting consumer and survey data, delivering targeted marketing messages, and distributing Personal Identification Numbers (PINs) via the Internet, Web-TV and related electronic media as disclosed in said patent application Ser. No. 09/060,783 dated Apr. 15, 1998. In the case of a calling card, the result is manifested in an electronic image of a free telephone calling card that incorporates the marketing message, 800 number for fulfillment and the PIN number, all delivered by a secure Internet server. The Electronic Free Calling Card is given as an immediate reward for taking a specific action on the Internet such as completing an on-line survey. The invention disclosed in the above application permits, for the first time, the ability to send a premium to a consumer that can be used immediately without even printing something out. The consumer need only write down the 800 number and his/her personal PIN number, and can immediately make free long distance calls.

It should be noted that if a consumer already has a calling card, in accordance with one aspect of the present improvement invention whether it be an Electronic version from this system, or a physical card received in the mail for example, free calling minutes can be added to the card rather than issuing a new card. The improvement invention thus includes the methodology and software to construct transactions on the Internet that can be transmitted to the phone company's FTP and are subsequently used to update the phone company's internal computers to reflect the addition of free calling minutes to a particular PIN number. The basic invention and improvement also allows other premiums and debit/credit cards to be transmitted to consumers such as, but not limited to: gasoline cards, ATM cards, Smart cards (cash debit system), credit cards, movie rental cards, cards providing free Internet access time or free access to a particular Web site and activities at that site, and airline cards. Further the improvement inventionallows value to be added to any of these types of debit cards in a manner similar to that described above for adding free calling minutes to existing calling cards.

The turnkey EPC survey and free calling card system of the basic invention includes: survey design and phrasing of questions for maximum market research effectiveness, programming the survey to run on a Web server, maintaining the survey data securely, electronically processing and delivering PIN numbers securely, preventing system abuse by only allowing one PIN # per unique E-mail address (an improvement to the basic invention) or by employing "cookies" technology, providing the long distance minutes, adding free calling minutes to an existing card (also an improvement to the present invention), providing a facsimile image of a phone card (the Electronic Free Calling Card) with imprinted PIN number and tailored marketing message (which the consumer can print out on his user station/PC), playing audio messages that match the marketing messages printed on the phone card image, interacting with the caller via an Interactive Voice Response System (IVR), survey database management and survey reports.

A subset of the improvement invention concerns sending important healthcare messages to patients via E-mail. The basic invention captures each patient's unique E-mail address when they are applying for a free calling minutes. This address is stored in the system's database along with the patient's name and medical condition. This information is matched against healthcare information (ie: information on taking medicine) previously stored in the client database. Then for example, if you indicated that you were suffering from asthma, you would receive a variety of information via E-Mail about your condition. Typical information might include symptoms to watch for, questions to ask your doctor, how to find a specialist in your area, side effects of various medications, etc:.

The following description is one example of the use of the present basic invention and the improvement invention in the pharmaceutical/medical health care industry:

The ADF Pharmaceutical Company (fictitious) has a web site devoted to its prescription drug product ADZORP, a new cholesterol-lowering drug. It wishes to promote the benefits of this drug to prescribing physicians, pharmacists, and consumers and learn more about how to market its product to these audiences. To do this, ADF will develop a survey and use it to collect valuable market data as well as get qualified leads for their sales reps. Realizing that people may be reluctant to fill out such a survey without inducements, ADF will offer the Electronic Free Calling Card to each person who completes the on-line survey. Also, ADF wishes to offer different premiums (ie: phone cards with varying amounts of free calling minutes) and marketing messages to each audience depending upon their responses on the survey.

ADF, utilizing the invention, implements a survey on the secure server. Banners and links to the survey are placed on the ADF web site and on other web sites such as PharmInfoNet (http://www.pharminfo.com/). The survey is programmed in a way that encourages a complete and truthful response from each person surveyed. The survey is linked to a database of physician DEA numbers and pharmacist ID numbers to verify whether the respondent is a physician or pharmacist. The survey program uses cookies (tracks previous activity on an individual's user station/PC) and other Internet technology to prevent the same person from filling out the survey more than once in order to get multiple PIN numbers and defraud the system. In the improvement invention, the PIN # is sent to an individual's E-mail address. In this way, abuse is minimized by limiting PIN # transmissions to one per E-Mail address.

As soon as the user successfully completes the survey, he or she is presented with the EPC reward page consisting of an image of the phone card including the ADZORP logo and customized marketing message, an 800 number and in the exemplary invention disclosed in said application a PIN number that can be used to redeem the free long-distance calling minutes. This transaction is handled automatically by the system's secure web server, but can also be implemented on the client's (ADF's) server. The system also provides for distribution of a variable amount of free calling minutes depending upon answers to questions in the survey (this feature is possible only with the Electronic Free Calling Card technology). For example, physicians may be rewarded with 20 minutes of free long-distance calling, whereas pharmacists get 15 minutes, and consumers 10 minutes. (Note: the reward minutes may be in the form of a new calling card or in the improvement invention if the consumer enters a valid PIN # from an existing card, minutes can be added to that card.) Rewards depend upon the survey objectives and which audience is most critical to the advertiser as well as the budget allocated. The marketing message on the reward screen which is incorporated into the EPC image can also be tailored to the respondent's answers on the survey (another unique feature only available with the Electronic Phone Card). For example, a physician who, on the survey, indicates a willingness to substitute a generic for ADZORP can be presented with a marketing message that underscores ADZORP's superior features over the generic product. Also, when the physician uses the phone card, he will hear audio messages that match the marketing messages printed on the phone card.

It should be noted that the software guides the consumer through the process, encouraging truthful and complete responses. Responses are analyzed, a custom reward is built, and finally transmitted to the consumer's PC, Web-TV, Pager, or other electronic media. All PIN activity pertaining to adding free calling minutes to the card (in the improvement invention) is transmitted to the telephone company via an FTP so that their computer records are automatically and electronically updated. In this manner, the phone cards are ready for immediate use by the recipient.

As previously mentioned, in the improvement invention if the applicant is a patient, the system captures the name, address, medical condition an E-mail address. This data is matched against previously stored information about various medical conditions. When there is a match, important healthcare messages are E-mailed to the patient.

In summary, although standard phone cards and the Internet have been around for many years, it has not been obvious, until this invention, that the two could be brought together in ways that would enhance both. Advantages over prior art are as follows:

1. Phone Card rewards can be transmitted immediately (electronically) to consumers.
2. The immediacy of rewards is critical to the success of Internet advertising and promotion.
3. Eliminates the need and cost of manufacturing a phone card
4. Rewards (ie: number of free long distance calling minutes) can be tailored on the spot, depending upon the action performed by the consumer
5. Messages to consumers can be customized and printed on the electronic image of the phone card.
6. Entire promotion campaigns can be changed electronically overnight (prior art requires that all print advertising be re-done, a costly and tedious process)
7. Since consumer names and address may be gathered during the Internet Survey, the advertiser can continue to promote to those people who have visited their Web site.
8. Each time the consumer uses the phone card, he bears audio messages tailored to his specific needs (based upon his survey answers). These audio messages match the marketing messages printed on the phone card.
9. Proprietary filters prevent abuse of the system (previously, consumers could claim multiple cards/rewards, as there was no check) Limiting consumers to one PIN per E-mail address (in the improvement invention) in conjunction with "cookies" technology minimizes system abuse.
10. Eliminates the problem of theft of physical phone cards that had to be stored in warehouses for distribution to consumers.
11. Previously, standard phone cards were thrown away by consumers after the minutes were used up. Now, the consumer, in the improvement invention can take his standard card to the Web Site, enter his PIN number and receive additional free calling minutes in return for providing information or making purchases. This enhances a sponsor's ability to run consumer "Continuity" Programs (ie: on-going contact with the consumer). Also, in the improvement invention, by transferring reward data immediately and electronically to the telephone company via an FTP, the consumer may use his reward immediately.
12. The Electronic Phone Card also replaces the Business Reply Card (BRC) as it is used in product registrations. The consumer can come to a Web Site, enter his purchasing information, become immediately registered, and receive his phone card reward.
13. The phone card and Internet system in the improvement invention has now become a useful medical education tool in that it sends automatically, personalized healthcare messages to each patient's E-mail address.

Another aspect of the invention is that it allows the advertiser offering the Electronic Phone Card to make immediate changes to the entire program. For example, with the current art, if you mail a phone card to a consumer and decide that you made an error or want to change the look or message of the card, it is an expensive and time consuming process (probably 8–16 weeks minimum). With the Electronic Phone Card, you can change the look, message, offer, etc: within minutes, and your revised program is immediately available to the consumer world. Part of the invention is the software that allows you to do this.

The main hardware component of the system is an Internet secure server (computer). The software element consists of licensed and proprietary software written in HTML, Cold Fusion, and SQL Data Base.

BRIEF DESCRIPTION OF THE DRAWINGS

FIGS. 1A–1R shows what the consumer sees (on his user station-ie: PC or Web TV) as he goes through the survey/reward process.

DESCRIPTION OF THE PREFERRED EMBODIMENTS

Figure 2:
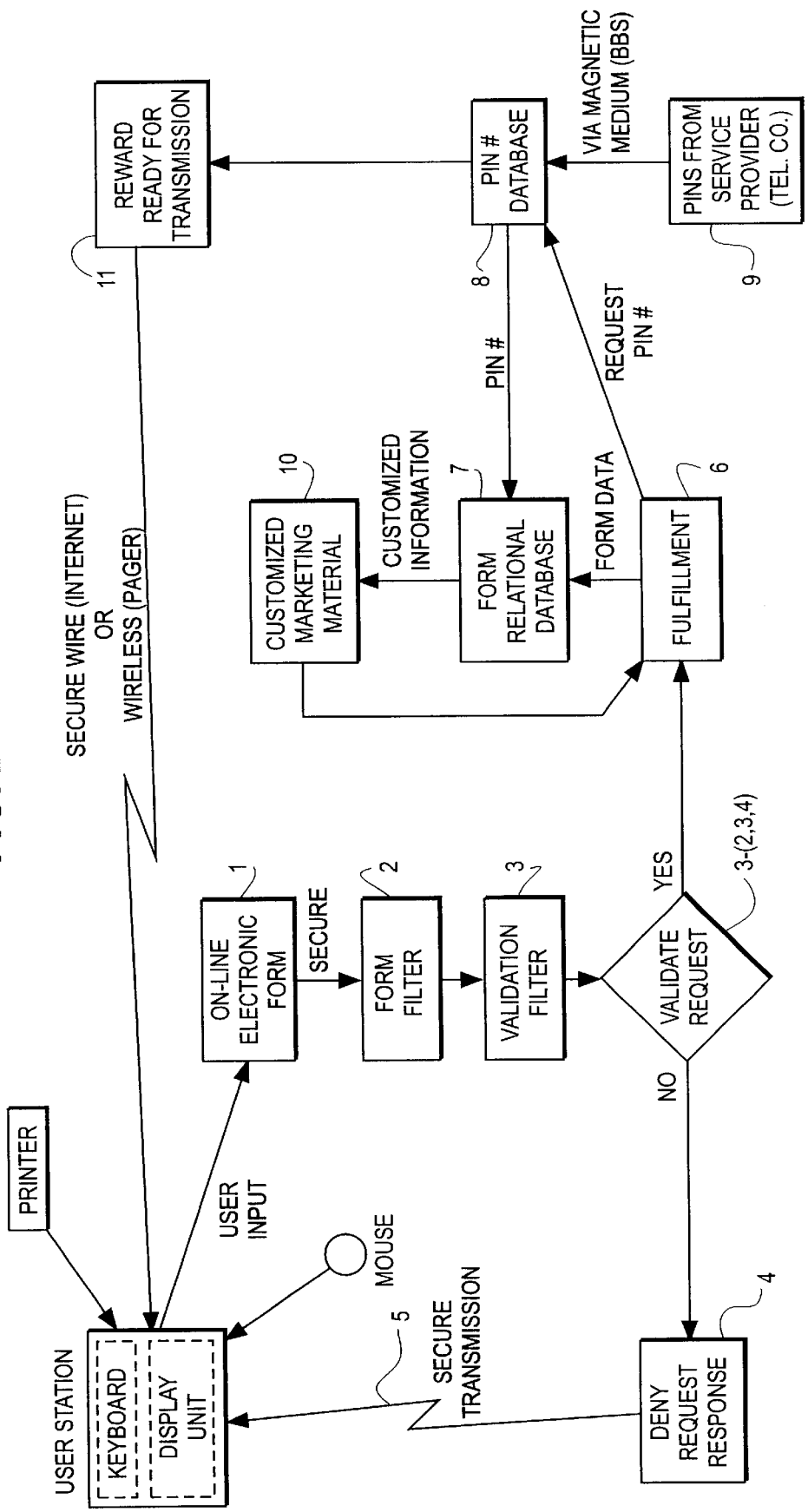
FIG. 2 is an overview that describes the components and functionality of the electronic phone card reward system.

FIGS. 1A–1R demonstrate what the consumer sees (on his PC or Web TV) as he goes through the Survey/Reward process. The programming code to accomplish this appears at the end of this specification.

The purpose of this demonstration is to show the "intelligence" of the process. The first series of pages (FIGS. 1A–1G) takes you from the banner ad appearing on any Web Site (FIG. 1A), through the survey, to a rejection because the consumer (patient) has previously received this reward (the system uses "cookies" technology and other proprietary software to prevent abuse by users—in particular, in the improvement invention when sending new cards to consumers, PIN numbers can be E-mailed thereby limiting consumers to one PIN per E-Mail address). The detailed steps are: in FIG. 1A the consumer sees a banner ad offering a free reward and clicks on it. The consumer is automatically transferred to FIG. 1B which is a Welcome Message and explanation. Next the consumer clicks on the "click here" icon and is transferred to FIG. 1C where he may be asked for a password or ID and is also asked if he is seeking a new card or in the improvement invention having minutes added to an existing card. He clicks on "submit" and next sees FIG. 1D which is the beginning of the survey. The survey continues in FIGS. 1E–1F and the consumer clicks on the "submit" icon. In 1G and as part of the improvement invention, this particular consumer sees a message that his application is rejected because he has already received a reward (ie: a PIN # had previously been sent to his E-mail address which he entered in 1C).

The second set of screens (FIGS. 1A–1C and 1H–1K) takes you through the process again. However, this time the user is a doctor, who is asked a customized set of questions (FIGS. 1I and 1J). In this case, the questions are answered completely, and the doctor receives his free electronic phone card (FIG. 1K). Note that the reward is 20 free minutes of long distance calling (in the next case, a patient receives only 10 minutes, indicating the "intelligence" of the system). Also notice the marketing message at the top of the Electronic Phone Card: it is tailored to doctors and invites them to call for further information. Further, each time the doctor uses the card, he hears audio messages that match the printed marketing messages, another "intelligent" feature.

In the third set of screens (FIGS. 1A–1C and 1L–1O), a patient successfully completes the survey process (FIGS. 1L–1N) and receives an Electronic Phone Card (FIG. 1O) with 10 free minutes of long distance calling. On this card, the marketing message is different from the doctor's message. Also each time the patient uses the card, he will hear audio messages that match the printed marketing message.

In the last set of screens (FIGS. 1A–1C and 1P–1R), it is shown how the system guides consumers through the survey process (1P and 1Q) and encourages complete and truthful answers. In this case, the consumer is a friend of a patient who is looking for information. While filling out the survey, the consumer neglects to answer a question about his healthcare provider and the system points out the error (FIG. 1R). Instructions are then provided (FIG. 1R) to correct the situation. Note on FIGS. 14 and 15 of the improvement invention that if this reward is adding time to an existing card, such a message is delivered rather than the image of a new card. Also, in the improvement invention on a new card the PIN # may be sent to an E-mail address rather than displaying it on the phone card image. As mentioned before, this is a security step that can limit rewards to one PIN per E-mail address.

Now refer to FIG. 2 which is a system flowchart overview and describes the components and functionality of the electronic phone card reward system. The block numbers in FIG. 2 match the Block numbers below.

In Block 1—(On-Line Electronic Form), the consumer fills out the on-line Form from his User Station (ie: PC, Web TV, etc:). This Form could be a survey, application, registration, subscription, or other task defined by an advertiser who wishes to deliver rewards and/or debit/credit cards via the Internet or other electronic media. The Form will contain information defined by the advertiser ("advertiser" is defined as a business which uses the Internet as an advertising medium and wishes to use the Electronic Phone Card to improve return on investment).

The consumer also indicates here whether he is seeking a new phone card (in which case he enters his name and E-mail address) or in the improvement invention if he is adding time to an existing phone card (in which case he enters the PIN number from his existing card). This will determine what type of reward messages are sent to the consumer's display screen.

Once completed, the consumer submits the form electronically to the system's secure server by clicking the "submit" icon on his user station screen. Transmission can be done through either wire or wireless communications. In Block 2—(Form Filter), the submitted Form is parsed by proprietary software against the advertiser's defined criteria. The Form must meet minimum defined criteria to be accepted and rewarded. The Form is designed to be "intelligent," that is to encourage truthful and complete response from the consumer. For example, if an applicant indicates that he/she is a doctor, then their supplied DEA number must match the table of valid numbers. If a patient indicates that they are on prescription medication for a particular condition, then in another part of the survey they must indicate the name of the medication. Also, the name field must be alphabetic, title or job description must be valid, zip code must be valid and match the indicated state and city, telephone number must be present and valid, and all designated questions must have been answered. (See "Description of Survey and Phone Card Reward Process" document, which is a part of this application).

In Block 3—(Validation Filter), the submitted Form is parsed by a proprietary software program against phone card verification criteria which is defined by the advertiser. Verification employs a combination of licensed and proprietary software technologies created for the electronic phone card. The software filter is designed to prevent wrongful distribution of PIN numbers (i.e. system abuse). It accomplishes this by checking an individual's previous PC activity (cookie technology) and rejecting the application if he/she has previously received a reward for this particular promotion. Additionally in the improvement invention, it may check the individual's E-mail address against a database of E-Mail addresses that have previously received a PIN #. Any "matches" are rejected. It also compares demographic data supplied by the individual against a database of consumers responding to other promotions. Differences prompt a request for clarification from the consumer before proceeding. The Form must meet minimum verification (ie; all questions answered, all demographic data properly filled out, no inconsistencies between answers to different questions, etc:) criteria to be accepted and rewarded (done in blocks 6–9 and 10–11).

In Block 4—(Validate Request), if either block#2 or #3 filter criteria are not met, then the proprietary software denies the request in blocks#4 and 5. If criteria in #2 and #3 are met, then the applicant's proprietary software performs reward fulfillment in block#6.

In Block 5—(Deny Request Response), if the Form fails either #2 or #3 filter criteria, then the proprietary software returns a customized message denying the reward request. Deny messages vary depending upon which filter criteria was not met.

In Block 6—(Fulfillment), if the Form is accepted, proprietary software performs reward fulfillment. The approved Form is added to the Form Relational Database (in block #7) and a unique PIN number is assigned to the approved Form (when issuing a new card) from the PIN database (#8). If in the improvement invention free calling minutes are being added to an existing card, the system is signaled (such as shown in FIG. 8B) to add time to an existing PIN rather than creating a new card. A transaction is created in the improvement invention to indicate this and is transmitted to the phone company in FIG. 8A.

In Block 7—(Form Relational Database), data from the approved Form is added to the relational database. The design of the database incorporates advertiser defined data, consumer demographics, assigned PIN numbers and the free calling minutes associated with each. This information allows advertisers to track who is using the premium and thereby modify their campaign accordingly. Each Form has a unique database associated with it.

In Block 8—(PIN Number Database), a unique PIN number is assigned to the approved Form and is E-Mailed to the consumer's E-mail address when a new card is created. This PIN is added to the Form Relational Database (block #7) and assigned to the Electronic Phone Card image or is E-Mailed (FIGS. 10 6–22). Each On-Line Electronic Form (#1) is given a list of unique PIN numbers. This is a restricted list of numbers that is stored on the system's secure server. PINs from existing cards are also stored in the database. If in the improvement invention consumers indicate in 1–5F that they are adding time to an existing card, the system checks to make sure it is a valid PIN (in 1–5H) or else the consumer is sent an error message and must submit a valid PIN to continue.

In Block 9—(PIN Numbers from Service Provider-Telephone Company), PIN numbers for the PIN Database (block #8) are downloaded either from removable medium or secure BBS. These PIN numbers are provided by the service provider or telephone company. They consist of PINs for new cards and PINs for existing cards.

Figure 14:
FIGS. 14 and 15 show examples of an Electronic Phone Card reward as it appears on the consumer's user station screen.
Figure 15:
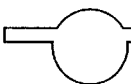

In Block 10—(Customized Rewards and Marketing Messages),—based on Form information stored in Database (#7), a proprietary software program assembles a unique marketing message (printed and audio) for each reward distributed (See FIGS. 14 & 15). These marketing messages are customized based upon the advertiser's criteria. Also customized is the size of the reward based upon answers to the Form (ie: 10 free calling minutes for patients, 20 free minutes for doctors, 30 free minutes for pharmacists, etc:).

Figure 2A:
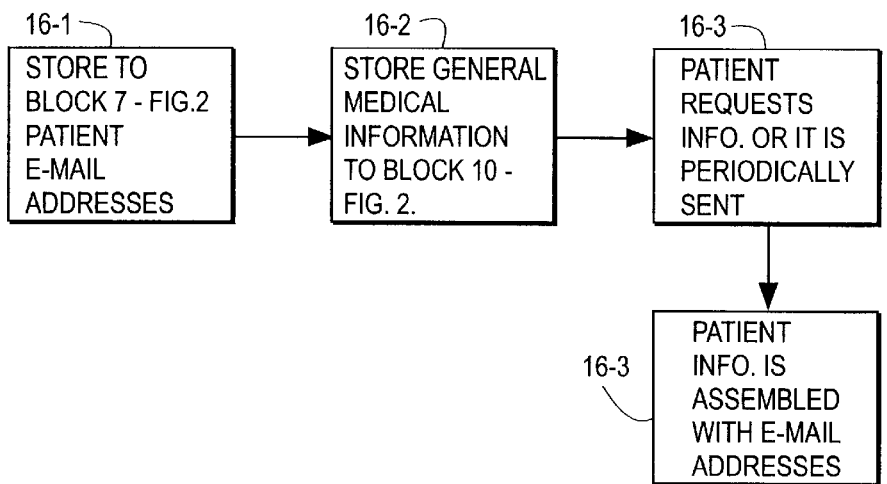
FIG. 2A is a part of the improvement invention and concerns delivering personalized healthcare messages to a patient's E-mail address based upon information supplied by the patient in the Electronic Phone Card system.

All of the assets of the customized marketing messages are stored on the secure server (computer where the web site exists) including healthcare messages that are used in the sub-sytem described in FIG. 2A. These assets consist of text, graphics, animation, audio and video information. The customized messages will comprise some combination of these assets. All assets for the reward can be changed easily, based upon demographic information, as well as advertiser need. There is no limit to the number and type of customized messages that can be created by the software program for the reward (block 11).

In summary, a unique element of the software is that it permits a tailored reward to be custom built in real time (electronically and totally automated) whether it be a calling card or some other consumer reward debit card, depending upon the particular promotion and the consumer's answers to the survey or Form. It determines the appropriate number of free calling minutes to be rewarded or other reward to be given, the appropriate marketing messages to be printed on the facsimile of the phone card or other debit card, and if the reward is a phone card the appropriate audio messages to be played to the consumer each time he/she uses the phone card (see examples FIGS. 14 & 15). Uniquely, the system can create new cards or in the improvement invention add minutes to existing cards, all accomplished immediately and electronically.

In Block 11—(Reward), the Form's reward is delivered in real-time by electronic means. Distribution is through a secure wire (ie: Internet) or wireless (ie: Pager) transfer. The digital nature of the reward permits immediate changes to the Form or reward at any point in the program's usage cycle. The reward may be in the form of a new card or in the improvement invention a message indicating free calling time has been added to an existing card.

Figure 3:
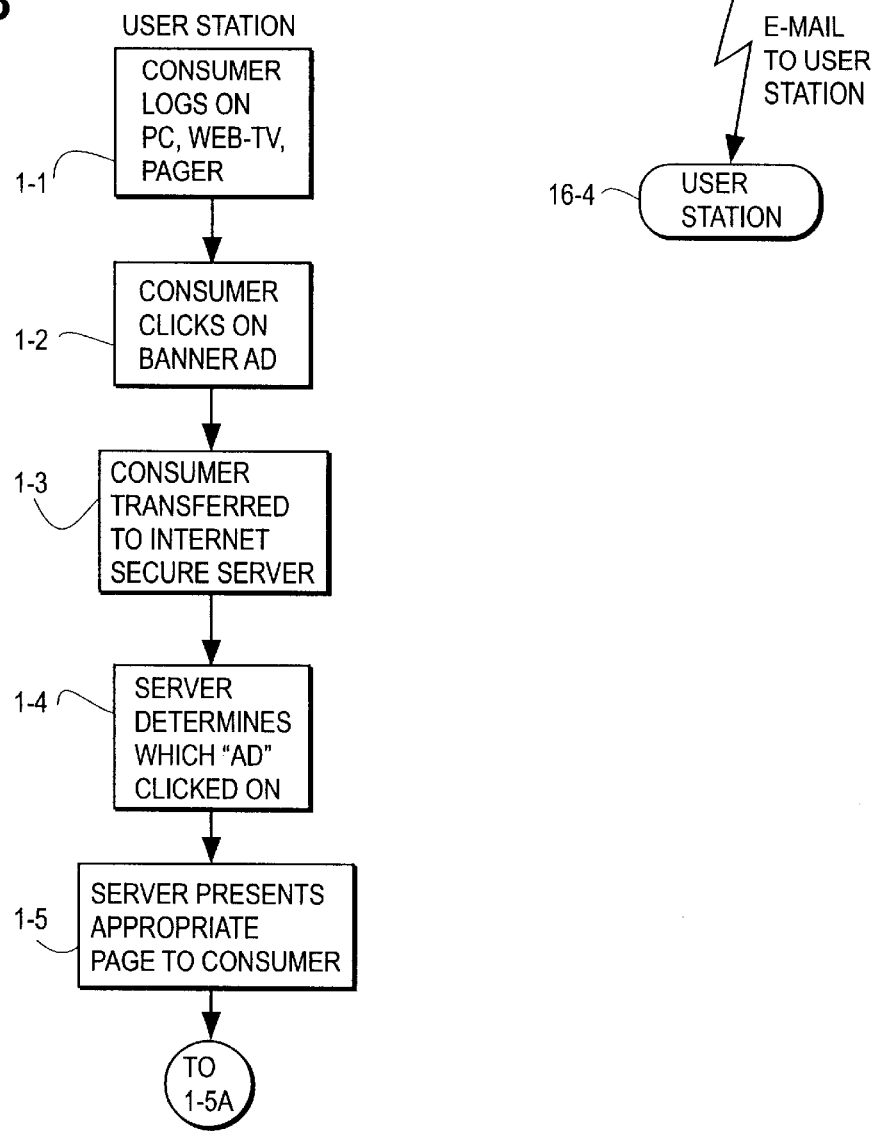
FIG. 3 shows the detailed flowchart steps of Block 1 in FIG. 2, beginning when the consumer turns on his User Station (ie: PC or Web TV) until he is presented with the appropriate data to view.

Now refer to FIG. 3 which is a detailed flowchart of Block 1 in FIG. 2 and shows the program steps from when the consumer turns on his use station (PC or Web TV) until he is presented with appropriate data to view.

Block 1-1. Consumer or professional logs onto Internet via his User Station (ie: PC, Web-TV, Pager, or other electronic media). Consumers may, for example, be logging on because: they saw a print or TV ad advertising a free electronic phone card or, have received a phone card in the mail and they are logging on to have time added to their card, or they are looking for specific information, or they are just "surfing."

Block 1-2. Consumer sees banner ad (on the Internet) offering free electronic phone card and "clicks" on the ad.

Block 1-3. Consumer is transferred automatically to the system's secure server (defined as a computer with proprietary software).

Block 1-4. System determines which ad consumer has clicked on and retrieves appropriate assets for this particular program. Assets include the survey form for this particular promotion, graphics, marketing messages, audio messages, and animation.

Block 1-5. Serve transfers appropriate survey and messages to consumer's PC screen or Web-TV. The transfer is accomplished with existing Internet software.

Figure 4:
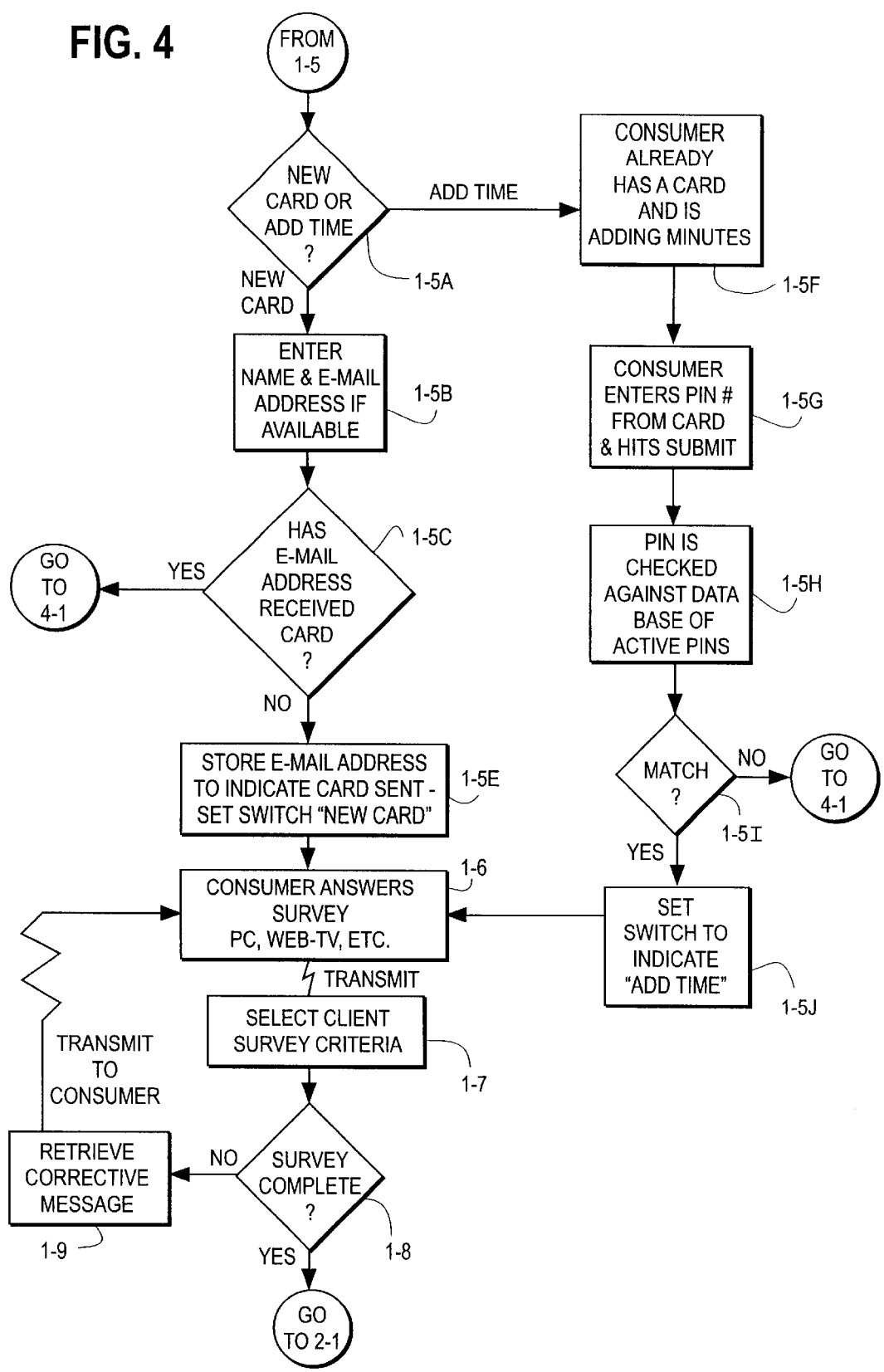
FIG. 4 is a continuation of FIG. 3 and shows the steps of the consumer beginning to answer questions from the survey presented to him. It is also the place where consumers indicate they are either seeking a new phone card or are adding minutes to an existing card.

Now refer to FIG. 4 which is a continuation of FIG. 3 and shows the steps of the consumer beginning to answer questions from the survey presented to him.

Block 1-6 and 1-5A-5L. Consumer follows instructions on the screen for filling out the survey. (See exhibit entitled "Description of Survey and Phone Card Reward Process.") As an example, the consumer may be asked for his/her name & address, telephone, medical condition (if a medical program), current medication and type of health insurance coverage. Certain fields may be optional. However, others may be mandatory and the consumer will not be eligible for a reward if mandatory fields are not completed. If the consumer has an e-mail address, it is entered in 1-5B and can be used later (in 6-22B) to securely transmit his/her reward (ie: PIN number). If the consumer does not have an e-mail address, then the reward (PIN number) appears on their display screen. When the survey is completed, consumer is instructed to click on a "Send" banner and the survey is transmitted to our secure server. The consumer also indicates here whether he is seeking a new phone card or is seeking to have free calling minutes added to an existing card. The system sets switches to record the choice made and determines if the PIN # being entered as an existing card is valid.

Block 1-7. The consumer's survey is isolated in a work area and client criteria is retrieved from the asset database (block 10). The survey will, in the next block, be evaluated for accuracy according to this client criteria.

Block 1-8. A key element of the system is that it "intelligently" evaluates the survey form for completeness and accuracy. In other words, it encourages truthful answers. In this block, each field is checked for completeness. For each mandatory field that is incomplete, a switch is set and the system goes to Block 1-9 where correction takes place. If the survey is complete, the system goes to Block 2-1.

Block 1-9. Determine which switches were set in Block 1-8. Move the appropriate error message to the work area and transmit to the consumer. The consumer makes the correction and is re-entered into the system at Block 1-6.

Figure 5:
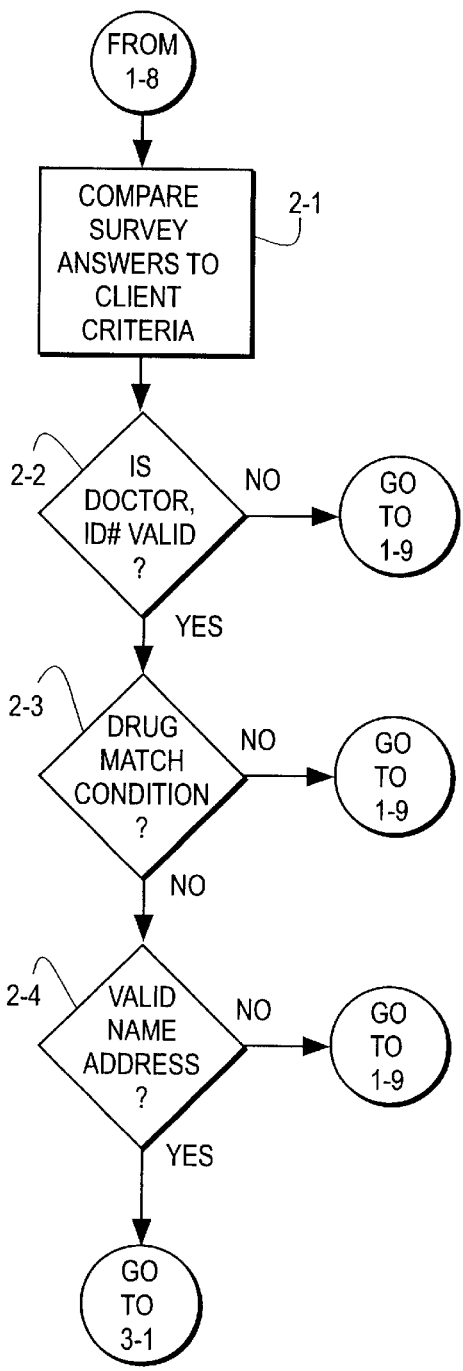
FIG. 5 shows the detailed flowchart steps of Block 2 in FIG. 2 and illustrates some validity checks on the consumer's answers to the survey.

Now refer to FIG. 5 which shows the detailed flowchart steps of Block 2 in FIG. 2 and illustrates some validity checks on the consumer's answers to the survey.

Block 2-1. The survey is, at this point, determined to be complete. "Intelligent" assets are now retrieved which will evaluate the form for truthfulness and logic.

Block 2-2. Although the survey may be medical or non-medical, as an example, we will use medical survey criteria for purposes of this flowchart. In this block, if the person filling out the survey indicated that he/she is a doctor, then their ID number is matched against a table of valid ID numbers. If the number is valid, they are passed to Block 2-3. If the number is invalid, an error switch is set indicating an invalid ID number, and they are passed to Block 1-9 where correction takes place.

Block 2-3. If, for example, the consumer has indicated that he/she is taking a particular medication, the medication is matched against a table of approved conditions (ie: is this medication approved for this condition?). If the medication does not match the condition (also indicated by the consumer in a different part of the survey), an error switch is set and they are passed to Block 1-9 where correction takes place. As indicated previously, the system is "intelligent" in that it compares answers from different parts of the survey and notes incongruities for correction. Ultimately, if the answers are not corrected, the transaction is terminated without a reward being delivered to the consumer.

Block 2-4. In this block, the name and address is evaluated. The name must be all "alpha" characters. If a title has been given, it must match the list of client approved titles for this particular promotion. Zip code must be present and numeric. It must also be consistent with the indicated city and state. Switches are set according to the error found and the consumer is passed to Block 1-9 where correction takes place. If there are no errors, the system proceeds to Block 3-1.

Figure 6:
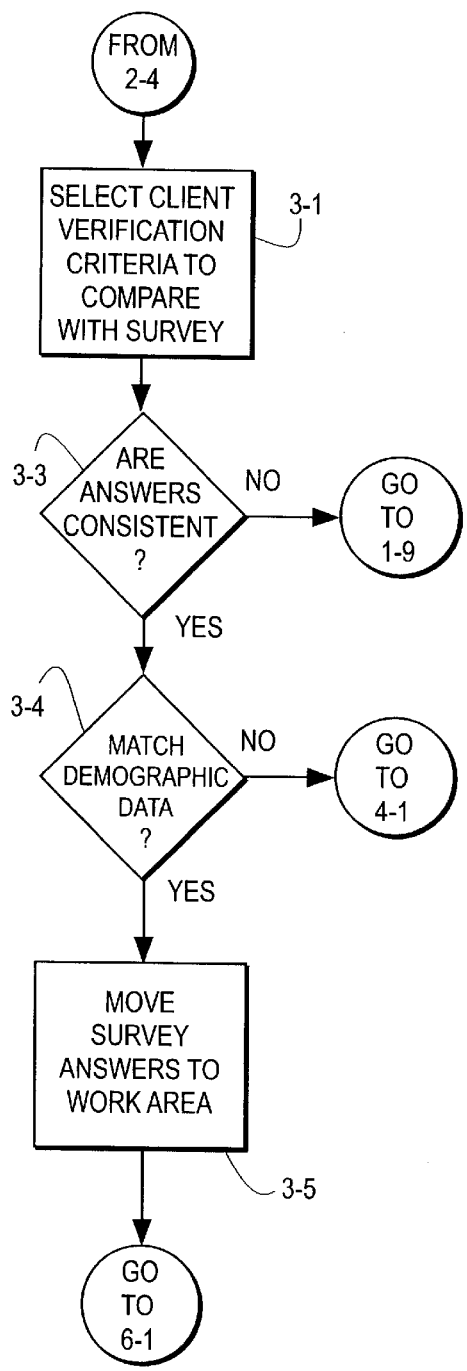
FIG. 6 shows the detailed flowchart steps of Block 3 in FIG. 2 and illustrates various filters to verify the consistency of consumer answers to the survey.

Now refer to FIG. 6 which shows the detailed flowchart steps of Block 3 in FIG. 2 and illustrates various filters to verify the consistency of consumer answers to the survey.

Block 3-1. In this block, additional advertiser criteria is applied against the consumer's answers to the survey. In addition, some of the data is passed against the Relational Database. The database contains an historical record of all activity that has taken place in this, and other promotions. After the criteria is retrieved, the consumer is passed to Block 3-2 where specific survey answers are checked.

Block 3-3. Additional consistency checks are made here according to client criteria. For example, if the consumer indicates high blood pressure, was he/she able to provide a valid numeric reading (ie: 150/100)? Whenever an inconsistency occurs, a switch is set to indicate the particular error, and the consumer is passed to Block 1-9 where correction takes place. Otherwise the consumer is passed to Block 3-4.

Block 3-4. In this block a demographic check takes place. For example, if the banner "ad" indicated to the consumer that they have to be between 40–50 years old, live on the east coast, and have been on allergy medicine for at least two years, then their survey must meet all of this criteria to qualify for the reward. If the survey fails the demographic test, a switch is set, and the consumer is passed to Block 4-1 where they are advised if ineligibility. Otherwise the process continues at Block 3-5.

Block 3-5. At this point, the survey has passed the "intelligent" test and a customized reward can be built. The consumer is passed to Block 6-1 for reward fulfillment.

Figure 7:
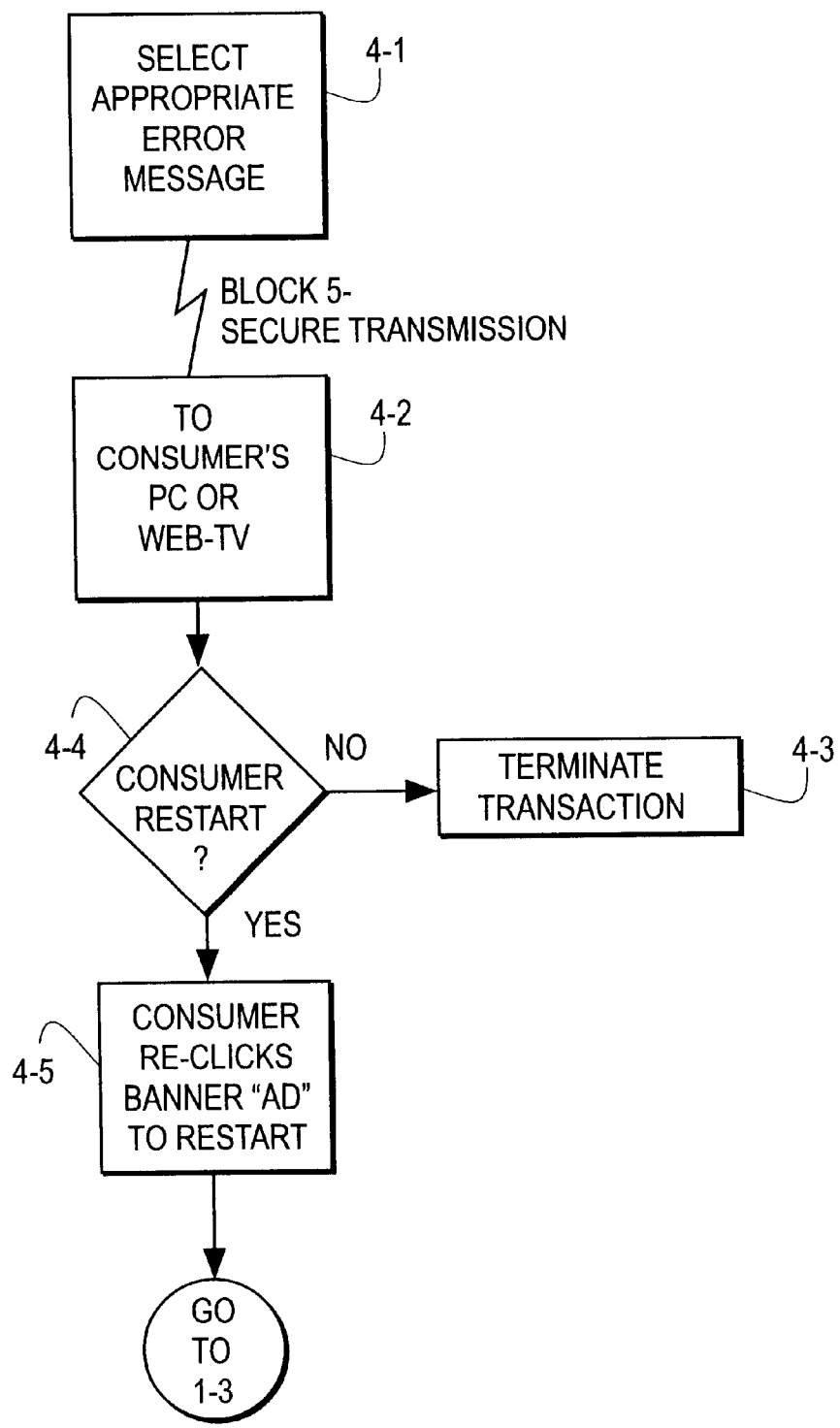
FIG. 7 shows the detailed flowchart steps of Block 4 in FIG. 2 and illustrates how consumers can re-start the process if they have given invalid answers.

Now refer to FIG. 7 which shows the detailed flowchart steps of Block 4 in FIG. 2 and illustrates how consumers can re-start the process if they have given invalid answers.

Block 4-1. All consumers passed to this point were determined to be ineligible because of one or more survey answers, or because they had previously received a reward for this particular promotion. At the time the problem was detected, a switch was set to indicate the particular situation. In this block, the "Deny Request" message is retrieved from a table based upon the switch setting.

Blocks 5 & 4-2. In these two blocks, the "Deny Request" message is transmitted to the consumer's screen with the appropriate explanation.

Block 4-4. After reviewing the message, the consumer may decide if they are still eligible and have simply made a mistake in answering the survey. If that is the case, they can click on the banner "ad" again and re-start the entire survey. If not, the transaction is terminated in Block 4-3 (see diagram).

Block 4-5. At this point, the consumer has decided to re-start the entire process. He/she has clicked on the banner "ad" again and is re-entered into the system at Block 1-2.

Figure 8:
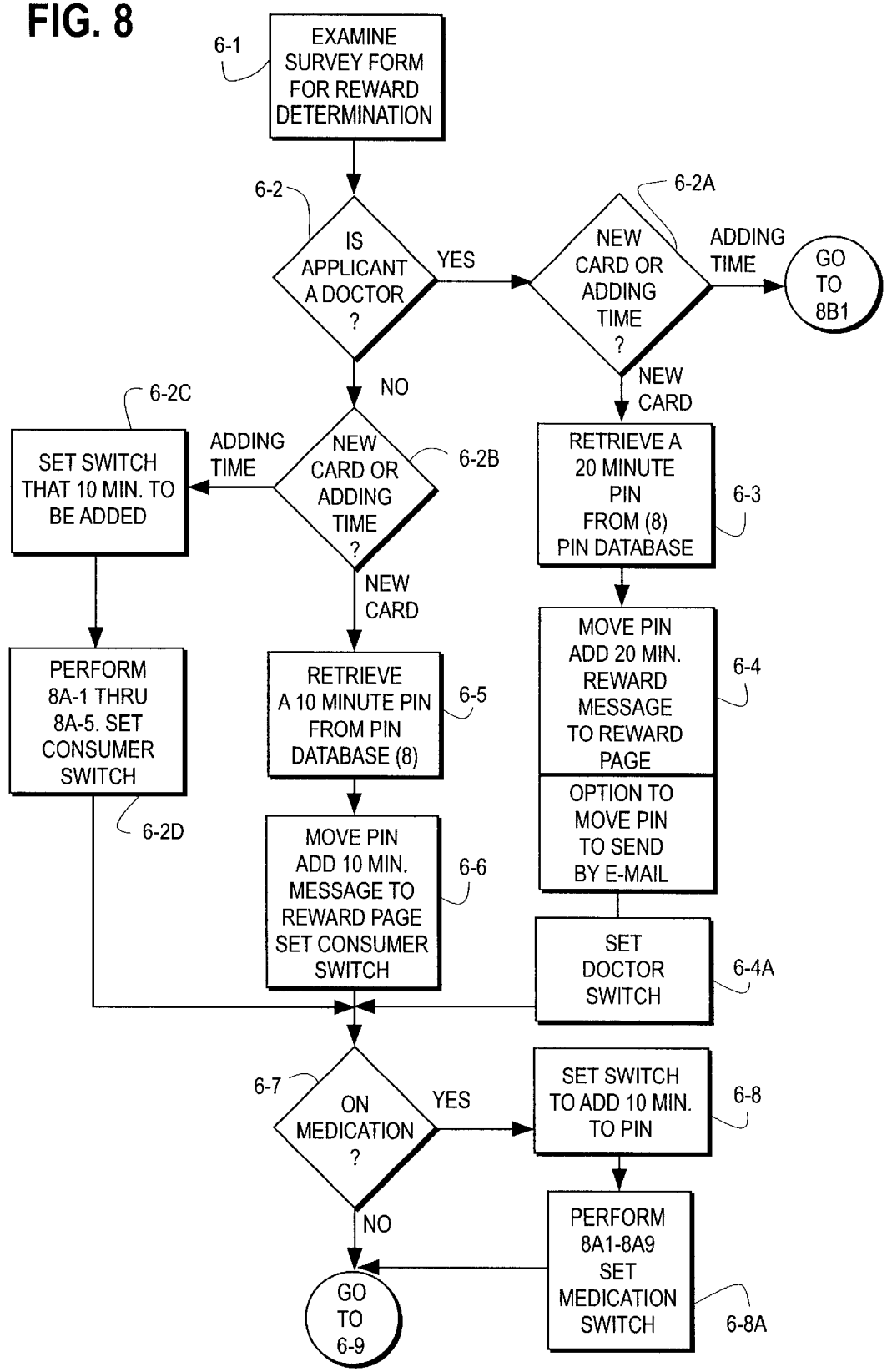
FIG. 8 shows the detailed flowchart steps of Block 6 in FIG. 2 and illustrates how different rewards are calculated according to the consumer's status and answers. It also shows how the system knows whether to add calling minutes to an existing card (part of the improvement invention) or to create a new card for transmission to the consumer.

Now refer to FIG. 8 which shows the detailed flowchart step of Block 6 in FIG. 2 and illustrates how different rewards are calculated according to the consumer's status and answers.

Block 6-1. One of the most novel aspects of the system takes place in Block 6. It is in this block that a customized reward is built for the consumer, in real time, and transmitted for immediate use. In preparation for the building of the reward, the consumer's survey answers are moved to the fulfillment work area.

Block 6-2. Again, the application of the entire system might pertain to a medical or non-medical promotion. However, for explanation, we are using a medical example. The first determination (based upon survey answers) is whether the applicant is a physician or not. If he/she is a physician, the system goes to Block 6-2A. Otherwise the system proceeds to Block 6-2B.

Block 6-3. At this point we know the applicant is a physician. By retrieving the client's reward rules from the asset database (block 10), it is determined that qualified physicians, in this promotion, get 20 minutes of free long distance calling. The system consequently goes to the PIN database (block 8) and retrieves a PIN containing 20 minutes of calling time if this is a new card as indicated by step 6-2A. Also a reward page is established to transmit to the physician. Note: In block 8 the system receives PINs from the telephone company. The PINs are generally 12 digits in length and each one has a different number of long distance minutes associated with it. These PINs are stored in the PIN database for use as needed. If this is not a new card, but an attempt to add time to an existing card, steps 8A1–8A5 are performed and go to Block 6-7. Else go to Block 6-4.

Block 6-4. At this point we still know that the applicant is a physician. Consequently the system goes to the asset database and retrieves the physician "marketing message" (ie: the printed message that the client wants the physician to see). Then the marketing message, the PIN, and the number of calling minutes are moved to the reward page (in real time) to ultimately be displayed on the physician's PC, Web-TV, Pager or other electronic device. Remember, the PIN # may optionally not be on the reward page but may be sent via E-mail as a security provision. Go to block 6-4A.

Block 6-4A. Since we still know that the applicant is a physician, a switch is set to indicate this to the system at a later point. Go to Block 6-7.

Block 6-5. Non-physicians (consumers) arrive at this block from block 6-2. By retrieving the advertiser's reward rules for consumers from the asset database (block 10), it is determined that in this promotion, consumers get 10 free minutes of long distance calling. The system consequently goes to the PIN database (block 8) and retrieves a PIN containing 10 minutes of calling time. (See note in block 6-3). Again, if time is being added to an existing card, steps 6-2C and 6-2D are performed to handle this. Go to block 6-6 if this is a new card or 6-7 if time is being added to an existing card.

Block 6-6. Since at this point, the system knows the applicant is a consumer, it retrieves the consumer "marketing message" from the asset database. Then the marketing message, the PIN, and the number of calling minutes 10) are moved to the reward page (in real time) to ultimately be displayed on the consumer's PC, Web-TV, Pager or other electronic device. Again, the PIN # may be sent via E-Mail. Go to block 6-7.

Block 6-7. In this block the system checks both the physician's and consumer's answer to the survey medication question. If the consumer does not take the medication in question, or the physician does not generally prescribe the medication, the system goes to block 6-9, else to block 6-8.

Block 6-8. If the consumer takes the particular medication, or the physician generally prescribes it, 10 additional free long distance minutes are added to the reward page. The addition of minutes is noted in the PIN database (8-3). Go to block 6-8A.

Block 6-8A. Set a switch to indicate a positive answer to the medication question and go to block 6-9.

Figure 8A:
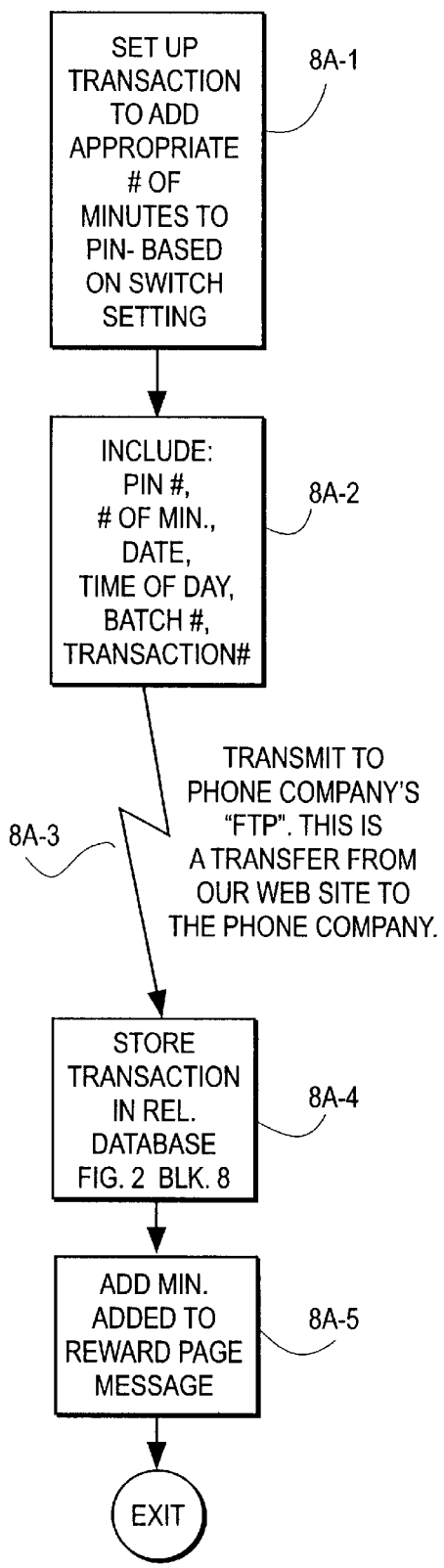
FIG. 8A shows how free calling minutes are added to an existing phone card and a transaction indicating this is transmitted immediately to the phone company to update their records electronically. This process is part of the improvement invention.
Figure 8B:
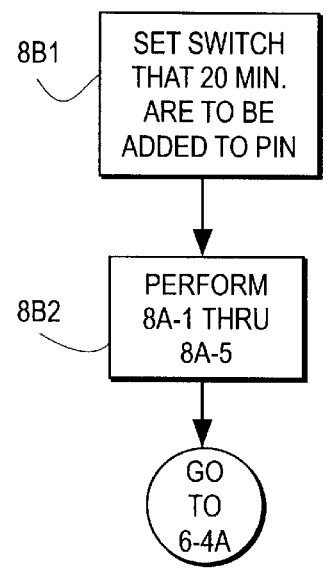
FIG. 8B shows how a switch is set to indicate that the consumer is having minutes added to an existing card rather then getting a new card, also part of the improvement invention.

Now refer to FIG. 8A which sets up a transaction to send to the phone company indicating the amount of time that is to be added to a unique PIN #.

Now refer to FIG. 8B which shows how a switch is set to indicate that the current transaction is not a new card but rather an existing card, in which case calling time will be added to the existing PIN # if it was determined to be valid.

Figure 9:
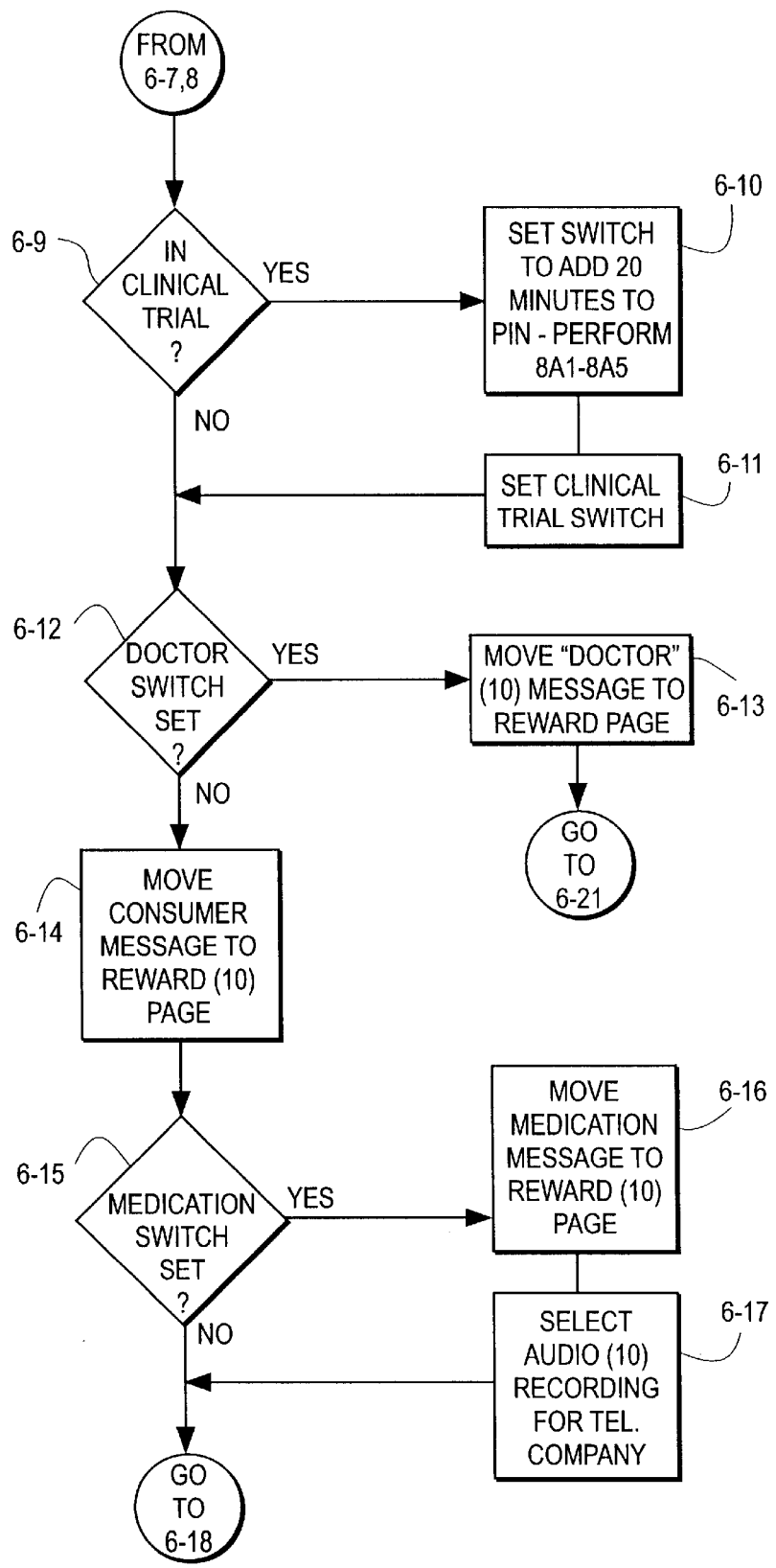
FIG. 9 is a continuation of FIG. 8 and shows how different marketing messages (printed and audio) are delivered to the consumer based upon his status and answers.

Now refer to FIG. 9 which is a continuation of FIG. 8 and shows how different marketing messages are delivered to the consumer based upon his status and answers.

Block 6-9. In this block the system checks both the physician's and consumer's answer to the Clinical Trial question. For the physician, the question was whether you have recently enrolled any patients in the current clinical trial for this particular medication. For the consumer, the question was whether you are currently participating, or would be interested in participating in the current clinical trial. If either of the answers is "yes", go to block 6-10. Else go to block 6-12.

Block 6-10. Since either the physician or consumer has answered "yes" to the clinical trial question, 20 additional free long distance calling minutes are added to the reward page. The addition of the minutes is noted in the PIN database (8-3). Go to block 6-11.

Block 6-11. Set a switch to indicate a positive answer to the clinical trial question and go to block 6-12.

Block 6-12. In block 6-4A, a switch was set to indicate that this particular applicant was a physician. If the switch is set, go to block 6-13. Else go to block 6-14.

Block 6-13. Since the switch was set to indicate a physician, retrieve the physician marketing message from the asset database and move it to the reward page. Reset the physician switch and go to block 6-21.

Block 6-14. Since the physician switch was not set, the applicant is a consumer. Retrieve the consumer marketing message from the asset database and move it to the reward page. Go to block 6-15.

Block 6-15. In block 6-8A, a switch was set to indicate a positive answer to the medication question. If the switch is set, go to block 6-16, else go to block 6-18.

Block 6-16. Since the switch was set to indicate a positive answer to the medication question, retrieve the medication marketing message from the asset database and move it to the reward page. Go to block 6-17.

Block 6-17. Select the appropriate "medication" audio message (ie: these are audio messages heard by the consumer or physician when using the phone card reward) from the asset data base and make note of it in the PIN database (8-3). When this PIN database is transmitted to the telephone company, it tells them how many free calling minutes to give to the card holder and which audio messages to play (Audio messages are pre-recorded and stored at the telephone company and the system software tells the phone company which recording to play based upon the consumer's profile and survey answers. The recordings match the printed marketing message on the phone card). Reset the medication switch and go to block 6-18.

Figure 10:
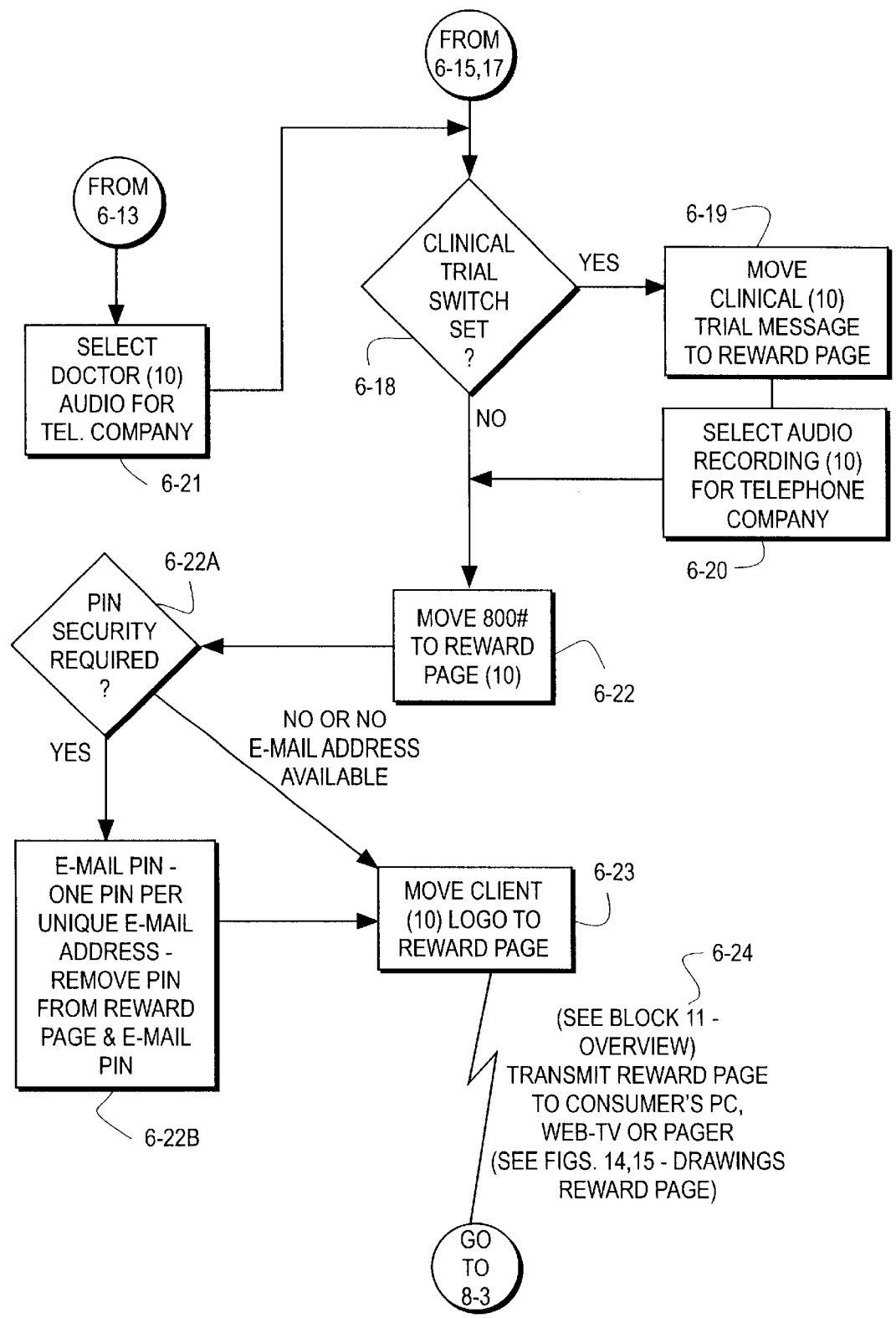
FIG. 10 is a continuation of FIG. 9 and shows how the system builds the phone card reward and assembles it for transmission to the consumer's user station. It also shows that PIN numbers can be sent to the consumer via E-mail at the same time that the 800# and phone card image are transmitted to the consumers display screen. This is a security function that only permits one PIN# per unique E-mail address and is part of the improvement invention.

Now refer to FIG. 10 which is a continuation of FIG. 9 and shows how the system builds the phone card reward and assembles it for transmission to the consumer's user station.

Block 6-18. In block 6-11 a switch was set to indicate a positive answer to the clinical trial question. If the switch is set, go to block 6-19, else go to block 6-22.

Block 6-19. Since the switch was set to indicate a positive answer to the clinical question, retrieve the clinical trial marketing message from the asset database and move it to the reward page. Go to block 6-20.

Block 6-20. Select the appropriate "clinical trial" audio message (ie: these are audio messages heard by the consumer or physician when using the phone card reward) from the asset data base and make note of it in the PIN database (8-3). When this PIN database is transmitted to the telephone company, it tells them how many free calling minutes to give to the card holder and which audio messages to play. Reset the clinical trial switch and go to block 6-22.

Block 6-21. This block was arrived at from block 6-13 at which point the system knew the applicant was a physician. Select the appropriate "physician" audio message (these are audio messages heard by the consumer or physician when using the phone card reward) from the asset data base and make note of it in the PIN database (8-3). When this PIN database is transmitted to the telephone company, it tells them how many free calling minutes to give to the card holder and which audio messages to play. Go to block 6-18.

Block 6-22, A, B. Go to the asset database, retrieve the appropriate 800# for this promotion, and move it to the reward page. This 800# is the number that phone card users dial to get their free long distance calling. If client criteria indicates that PIN security is required in 6-22A and an e-mail address is available (see 1-5B), remove the PIN from the reward page and transmit it to the consumer's E-mail address (only one PIN per E-mail address is allowed). Otherwise leave the PIN number on the reward page to be displayed on the user's display screen. Go to block 6-23.

Block 6-23. Go to the asset database, retrieve the appropriate client logo for this promotion, and move it to the reward page. Go to block 6-24.

Block 6-24. At this point the reward page has been fully assembled and is ready for transmission to the consumer's PC, Web-TV, Pager or other electronic device. Using standardized Internet transmission software, the phone card image is transmitted to the consumer in real time, and ready for immediate use. Go to block 8-3.

Figure 11:
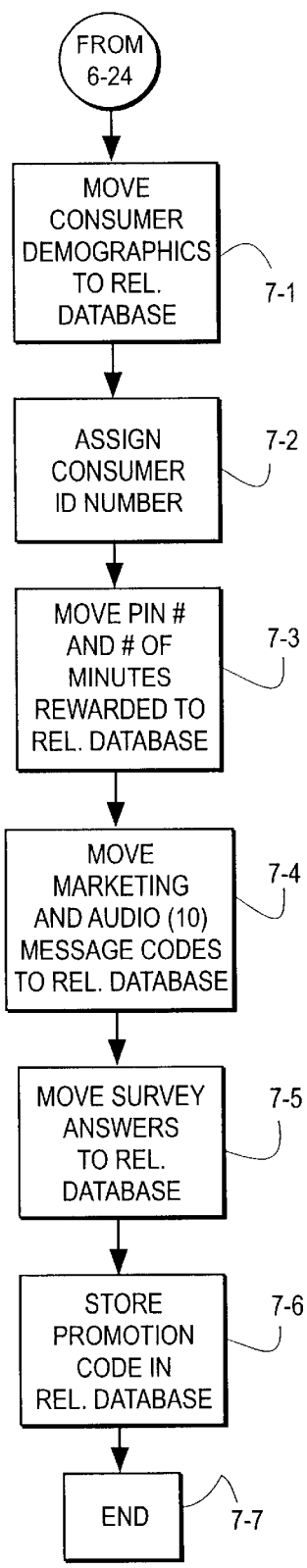
FIG 11 shows the detailed flowchart steps of Block 7 in FIG. 2 and illustrates how all pertinent consumer data from the transaction is stored in the system's relational data base, including demographics. This is important because advertisers need to analyze the success or failure of the current offering and plan future offerings. It also provides consumer data which can be used in follow-up or "continuity" programs.

Now refer to FIG. 11 which shows the detailed flowchart steps of Block 7 in FIG. 2 and illustrates how all pertinent data from the transaction is stored in the system's relational data base, including demographics.

Block 7-1. At this point, the reward has been given to the consumer. The system now stores all known information about the consumer and his/her answers to the survey questions. Since the consumer may have answered other promotions, the database may contain multiples of information about him/her. Demographic information from this particular promotion is moved to the relational database. Go to block 7-2.

Block 7-2. If the consumer has not participated in other promotions on this server, a permanent ID number is assigned. Go to block 7-3.

Block 7-3. Move the PIN number (described in block 6-3) and total number of free calling minutes awarded to the relational database. Go to block 7-4.

Block 7-4. Move the marketing messages (appearing on the customized reward page) and the audio message codes (discussed in block 6-17) to the relational database. (Audio messages are pre-recorded and stored at the telephone company; and the system software tells the phone company which recording to play based upon the consumer's profile and survey answers). Go to block 7-5.

Block 7-5. Move the consumer's survey answers to the relational database. This information will be useful in fixture promotions (ie: determining truthfulness of answers). It will also be useful should the client wish to do direct mail campaigns in conjunction with an electronic phone card program.

Block 7-6. The promotion code for this particular program is stored in the relational database.

Block 7-7. End of transaction.

Figure 12:
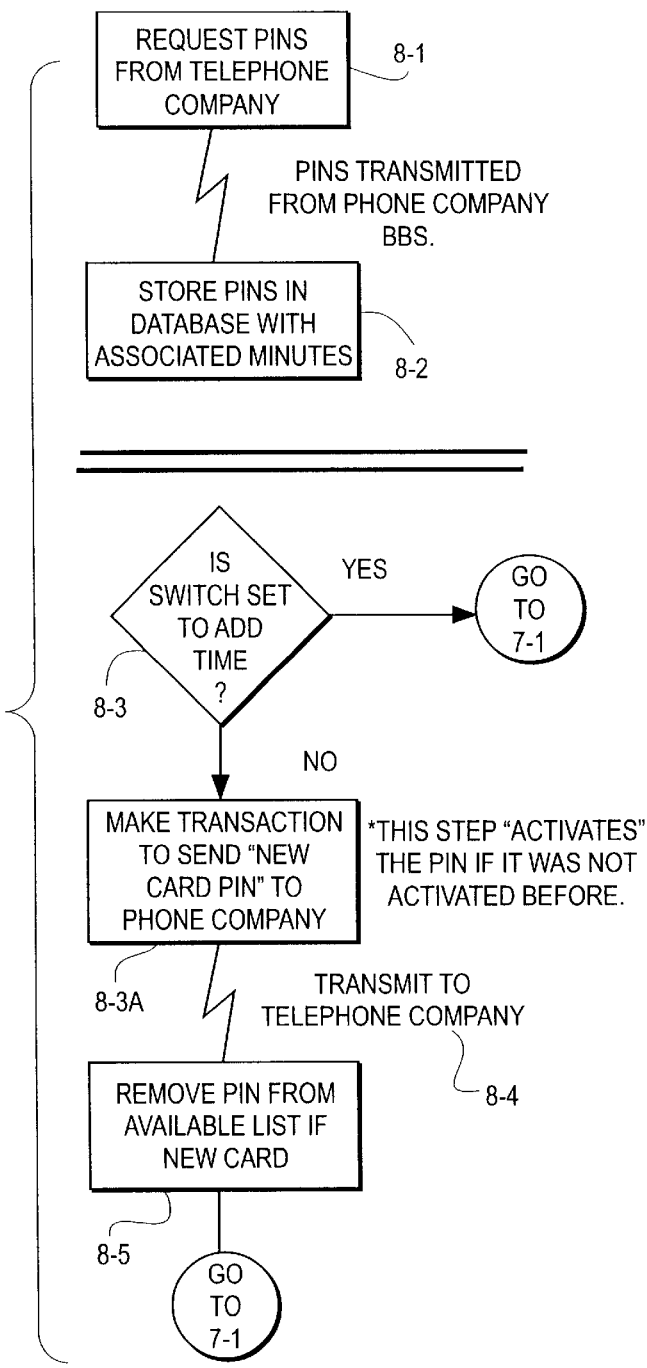
FIG. 12 shows the detailed flowchart steps of Block 8 in FIG. 2 and illustrates how PIN numbers are secured from the telephone company and stored in the data base for use in the phone card reward. It also shows PIN numbers being transmitted to the phone company to activate new calling cards.

Now refer to FIG. 12 which shows the detailed flowchart steps of Block 8 in FIG. 2 and illustrates how PIN numbers are secured from the telephone company and stored in the data base for use in the phone card reward.

Block 8-1. PIN numbers are requested from the telephone company. PINs are generally 12 digits in length and identify the number of free calling minutes available on a particular phone card. The PIN (which appears on the image transmitted to the consumer or is sent via E-mail) has associated with it, audio messages to be played when the card is used. The telephone company transmits these PIN numbers to the server for storage until required. Existing PINs are also transmitted from the phone company so that they can be verified when consumers indicate they are attempting to add time to an existing card.

Block 8-2. PINs, upon being received, are stored in the PIN database along with their associated number of free calling minutes.

Block 8-3. Here we ascertain whether a consumer is adding time to an existing card or attempting to obtain a new card. If they are adding time, go to 7-1. Else go to 8-3A Block 8-3A. If the consumer is receiving a new card, the PIN number is assembled into a transaction and transmitted to the phone company in 8-4.

Block 8-4. The information assembled in 8-3A is transmitted to the telephone company. With this information, the telephone company will know to activate this PIN # in case it has not been previously activated. Go to block 8-5.

Block 8-5. All PIN numbers transmitted are coded as "unavailable" to the system. Go to 7-1.

Figure 13:
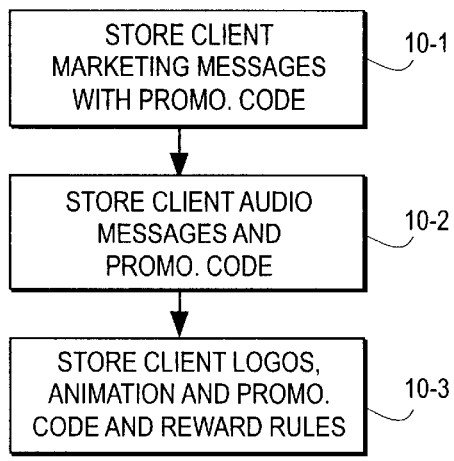
FIG. 13 shows the detailed flowchart steps of Block 10 in FIG. 2 and illustrates how all information about the advertiser's program is stored in the system's asset data base including marketing messages and rules for rewards.

Now refer to FIG. 13 which shows the detailed flowchart steps of Block 10 in FIG. 2 and illustrates how all information about the advertiser's program is stored in the system's asset data base including marketing messages and rules for rewards.

Blocks 10-1,2,3. The database built here is described throughout the flowchart as the asset database. The purpose of the database is to store all the information about the promotion that will be needed in assembling the consumer's reward (electronic phone card). All of the assets are stored on the secure server. These assets consist of text, graphics, animation, audio and video information. The final reward page will comprise some combination of these asset. All assets for the reward can be changed easily, based upon demographic information, as well as client of applicant need.

In summary, a unique element of the software is that it permits a tailored reward to be custom built in real time (electronically and totally automated) depending upon the particular promotion and the consumer's answers to the survey or Form. It determines the appropriate number of free calling minutes to be rewarded, the appropriate marketing messages to be printed on the facsimile of the phone card, and the appropriate audio messages to be played to the consumer each time he/she uses the phone card.

Now refer to drawings FIGS. 14 and 15 which are examples of an Electronic Phone Card reward as it appears on the consumer's user station screen. The examples are complete with: 800 access number, personal PIN number, printed marketing message, targeted audio message (heard when using the card), and showing the number of minutes of free calling rewarded.

Figure 16:
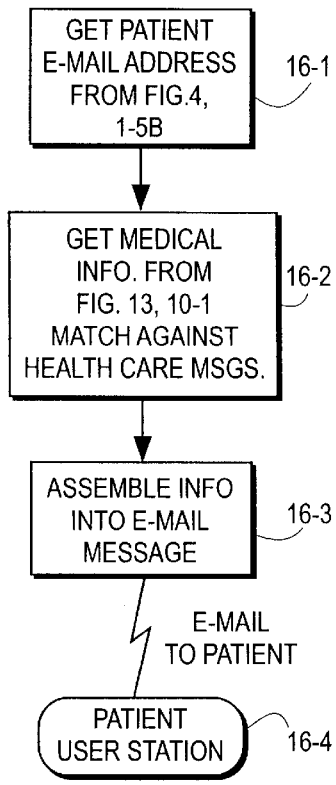
FIG. 16 shows the detailed steps of FIG. 2A—Overview of Patient Information System which is part of the improvement invention.

Now refer to FIG. 16 which describes the components and functionality of the Patient Information System which is a subset of the Electronic Phone Card System. The block numbers in FIG. 2A (overview) match the Block numbers below.

Block 16-1. Patient E-mail addresses that were stored in the system's relational database (FIG. 7) are retrieved.

Block 16-2. Patient medical information is retrieved from the system's relational database (FIG. 7). This data is matched against the asset database (FIG. 13) and healthcare messages are extracted from the asset database where they match the patient's stated medical condition or drugs they are taking.

Block 16-3. All information from 16-2 is assembled into an E-mail message to be sent to the patient.

Block 16-4. The personalized healthcare message is E-mail to the patient's E-mail address. Information in the message may include but is not limited to: side effects of a particular medication or type of medication, questions to ask your doctor, how to find a specialist in your area, symptoms to watch for, importance of self-care and importance of staying on your medication, etc:

The information to follow is the preferred system software written in HTML, Cold Fusion, and SQL Database for producing the screen images displayed to consumers in FIGS. 1A–1R.

```
<html>
<head>
<meta name="editor" content="HTML Assistant Pro 97 - http://www.brooknorth.com/">
<title></title>
</head>
<center>
<body bgcolor="ffffff">
<center><img src="art/headtype.gif"></center>
<center><table><td><FORM ACTION="DataEntr.CFM?guest_id=182" METHOD="POST">
<INPUT TYPE="hidden" NAME="guest_firstname_required" VALUE="Please enter your first name">
<INPUT TYPE="hidden" NAME="guest_lastname_required" VALUE="Please enter your last name">
```

-continued

```
<INPUT TYPE="hidden" NAME="street_address_required" VALUE="Please enter your street address">
<INPUT TYPE="hidden" NAME="city_required" VALUE="Please enter your city">
<INPUT TYPE="hidden" NAME="state_required" VALUE="Please enter your state">
<INPUT TYPE="hidden" NAME="zipcode_required" VALUE="Please enter your zipcode">
<INPUT TYPE="hidden" NAME="email_required" VALUE="Please enter your email address">
<INPUT TYPE="hidden" NAME="gender_required" VALUE="Please choose your gender">
<INPUT TYPE="hidden" NAME="cholestrol_yesno_required" VALUE="Please mention if you are
currently having high cholestrol">
<INPUT TYPE="hidden" NAME="medication_required" VALUE="Please choose if your Health care
provider has recommend any medication of cholestrol">
<INPUT TYPE="hidden" NAME="provider_yesno_required" VALUE="Please mention if you are
planning to visit your health care provider">
<INPUT TYPE="hidden" NAME="addit_info_required" VALUE="Please mention if your need any
additional information">
<table>
<TR><TD ALIGN="left">First Name:</td></tr>
<TR><TD ALIGN="left"><INPUT TYPE="text" NAME="guest_firstname" SIZE="60"
MAXLENGTH="50"></TD></TR><br>
<TR><TD ALIGN="left">Last Name:</td></tr>
<TR><TD ALIGN="left"><INPUT TYPE="text" NAME="guest_lastname" SIZE="60"
MAXLENGTH="50"></TD></TR><br>
<TR><TD ALIGN="left">Street Address</td></tr>
<TR><TD ALIGN="left"><INPUT TYPE="text" NAME="street_address" SIZE="60"
MAXLENGTH="70"></TD></TR>
</table>
<table>
<TR><TD ALIGN="left">City</TD><TD ALIGN="left">state</TD><TD
ALIGN="left">zipcode</TD></tr>
<TR><TD ALIGN="left"><INPUT TYPE="text" NAME="city" SIZE="34"
MAXLENGTH="40"></TD>
<TD ALIGN="left"><INPUT TYPE="text" NAME="state" SIZE="5" MAXLENGTH="20"></TD>
<TD ALIGN="left"><INPUT TYPE="text" NAME="zipcode" SIZE="15"
MAXLENGTH="20"></TD></TR></table>
<table>
<tr><td align=left>email Address:</td></tr>
<TR><TD ALIGN="left"><INPUT TYPE="text" NAME="email" SIZE="60"
MAXLENGTH="40"></TD></TR></table><br>
<TABLE>
<TR><TD ALIGN="left">Gender</TD></tr>
<tr><TD ALIGN="left"><INPUT type="radio" name="gender" value="M">Male</td>
<TD ALIGN="left"><INPUT type="radio" name="gender" value="F">Female</td></tr></TABLE>
<BR>
<TABLE>
<TR><TD ALIGN="left">Age</TD></tr><tr><TD ALIGN="left"><SELECT NAME="age">
        <OPTION VALUE=1>25-34
        <OPTION VALUE=2>34-44
        <OPTION VALUE=3>45-54
        <OPTION VALUE=4>54-64
        <OPTION VALUE=5>over 65
</SELECT></TD></TR></table><br>
<table>
<tr><td align="left">Do you currently have high cholesterol?</td></tr></table>
<table><tr><TD ALIGN="left"><INPUT type="radio" name="cholestrol_yesno" value="Y">Yes</td>
<TD ALIGN="left"><INPUT type="radio" name="cholestrol_yesno" value="N">No</td>
<TD ALIGN="left"><INPUT type="radio" name="cholestrol_yesno" value="D">Don't
know</td></tr></table><br>
<table><tr><td>Has your health care provider encouraged you to take any medication <BR>to reduce
cholesterol?</td></tr>
</table>
<table>
<TR><TD ALIGN="left"><INPUT TYPE="radio" NAME="medication" VALUE="Y">Yes</TD>
<TD ALIGN="left"><INPUT TYPE="radio" NAME="medication" VALUE="N">No</TD>
<TD ALIGN="left"><INPUT TYPE="radio" NAME="medication" VALUE="D">Don't
Know</TD></TR></table><br>
<table><tr><td>Do you plan to visit your healthcare provider ?</td></tr>
</table>
<table>
<TR><TD ALIGN="left"><INPUT TYPE="radio" NAME="provider_yesno" VALUE="Y">Yes</TD>
<TD ALIGN="left"><INPUT TYPE="radio" NAME="provider_yesno"
VALUE="N">No</TD></TR></table>
<br>
Would you like additional information about Allastatin ?
<table>
<TR><TD ALIGN="left"><INPUT TYPE="radio" NAME="addit_info" VALUE="Y">Yes</TD>
<TD ALIGN="left"><INPUT TYPE="radio" NAME="addit_info"
VALUE="N">No</TD></TR></table>
<BR><BR>
<INPUT TYPE="submit" VALUE="Submit"><input type="reset" value="Clear">
</FORM></td></table></center>
```

-continued

```
</body></center>
</html>
<HTML>
<HEAD><TITLE>EPC APPLICATION</TITLE></HEAD>
<BODY>
<CENTER><IMG SRC="art/headtype.gif"></CENTER>
<FORM ACTION="DataEnt.CFM?guest_id=182" METHOD="POST">
<INPUT TYPE="hidden" NAME="type_required" VALUE="Please select an appropriate option">
<center>
<TABLE>
<TR><TD ALIGN="left">Are you a :</TD></TR>
</TR><TD ALIGN="left"><INPUT TYPE="radio" NAME="type" VALUE="P">Patient</TD></TR>
</TR><TD ALIGN="left"><INPUT TYPE="radio" NAME="type" VALUE="F">Friend Or Loved
One</TD></TR>
<TR><TD ALIGN="left">or are you a health care professional</td></tr>
</TR><TD ALIGN="left"><INPUT TYPE="radio" NAME="type" VALUE="D">Doctor</TD></TR>
</TR><TD ALIGN="left"><INPUT TYPE="radio" NAME="type" VALUE="N">Nurse</TD></TR>
</TR><TD ALIGN="left"><INPUT TYPE="radio" NAME="type"
VALUE="Ph">Pharmacist</TD></TR>
</TR><TD ALIGN="left"><INPUT TYPE="radio" NAME="type"
VALUE="A">Administrator</TD></TR></table></center>
<CENTER><INPUT TYPE="submit" VALUE="Submit"><input type="reset"
value="Clear"></CENTER>
</FORM>
</BODY>
</HTML>
<HTML>
<title>Healthcare fulfillment</title>
<body bgcolor="ffffff">
<center><table><tr><td><table width="428"><tr><td><img src="art/head.gif"></td></tr></table>
<table width="428"><tr><td align="left"> Thank you for your response to our survey.<br><br>
Allastatin is the only cholesterol-lowering drug of its kind proven to help prevent a first heart attack in in
patients with elevated cholesterol despite the absence of symptoms.<br><br>
To receive free Allastatin starter kits for your patients, contact your
Allastatin representative or call 1-800-555-1234.
</td>
<td align="right"><img src="art/allastin.gif"></td></tr></table>
<table><tr><td><img src="art/bar.gif"></td></tr></table>
<table><tr><td><img src="art/20min.gif"></td>
<td> To Place a call from any touch tone phone:<br>
1. Dial 1-800 239-7956. Wait.<br>
2. At the prompt, enter your PIN number: <br><br>
3. Dial the area code and number you wish to call.<br></td></tr></table>
<table><tr><td><img src="art/barcomp.gif"></td></tr></table>
</tr></td></table></center>
</body>
</HTML>
</BODY></HTML>
<title>female fulfillment</title>
<body bgcolor="ffffff">
<center><table><tr><td><table width="428"><tr><td><img src="art/head.gif"></td></tr></table>
<table width="428"><tr><td align="left">The risk of a first heart attack increases dramatically for post-
menopausal women.</td>
<td> </td><td> </td><td> </td><td> </td><td> </td>
<td align="right" valign="center"><img src="art/allastin.gif"></td></tr></table>
<table><tr><td><img src="art/bar.gif"></td></tr></table>
<table><tr><td><img src="art/10min.gif"></td>
<td> To Place a call from any touch tone phone:<br>
1. Dial 1-800 239-7956. Wait.<br>
2. At the prompt, enter your PIN number: <br><br>
3. Dial the area code and number you wish to call.<br></td></tr></table>
<table><tr><td><img src="art/barcomp.gif"></td></tr></table>
</tr></td></table></center>
</body>
</HTML>
</BODY></HTML>
<center><IMG SRC="art/headtype.gif"></center><br>
<center>Please indicate the medication recommended by you / by your health care provider</center>
        <center><FORM ACTION="Datafi.cfm?guest_id=182" METHOD="post">
<table cellspacing=3%>
<INPUT TYPE="hidden" NAME="recom_med_required" VALUE="Please choose one of the medicine
from the list">
<TR><TD ALIGN="left"><INPUT TYPE="radio" NAME="recom_med" VALUE="C">Colestid</TD>
<TD ALIGN="left"><INPUT TYPE="radio" NAME="recom_med" VALUE="L">Lopid</TD>
<TD ALIGN="left"><INPUT TYPE="radio" NAME="recom_med"
VALUE="P">Allastatin</TD></TR>
<TR><TD ALIGN="left"><INPUT TYPE="radio" NAME="recom_med" VALUE="E">Estrogen
Replacement Theraphy</TD>
<TD ALIGN="left"><INPUT TYPE="radio" NAME="recom_med" VALUE="M">Mevacor</TD>
```

-continued

```
<TD ALIGN="left"><INPUT TYPE="radio" NAME="recom_med" VALUE="Q">Questran</TD></TR>
<TR><TD ALIGN="left"><INPUT TYPE="radio" NAME="recom_med" VALUE="Le">Lescol</TD>
<TD ALIGN="left"><INPUT TYPE="radio" NAME="recom_med" VALUE="N">Niacin</TD>
<TD ALIGN="left"><INPUT TYPE="radio" NAME="recom_med"
VALUE="O">Other</TD></TR></table>
<br>
<CENTER><INPUT TYPE="submit" VALUE="Submit"><input type="reset"
value="Clear"></CENTER>
        </FORM></center>
</BODY></HTML>
        <HTML>
<title>male fulfillment</title>
<body bgcolor="ffffff">
<center><table><tr><td><table width="428"><tr><td><img src="art/head.gif"></td></tr></table>
<table width="428"><tr><td align="left"> Today, 17 million Americans with high cholesterol are at risk
of a first heart attack, many will have no warning signs.</td>
<td> </td>
<html>
<title>EPC Banner</title>
<head></head>
<body bgcolor="#ffffff">
<center>
<img src="banner.gif"><br><br>
<table width="400"> <tr><td> Thank you for you interest in the <img src="epctext1.gif" border="0"
align="top"> To use the EPC demo, you will need a user ID and password. Once you have entered the
demo, complete the survey to receive your electronic phone card. You can fill out the survey as many
times as you like. <br><br>
<img src="epctext2.gif" align="top"> If you want to test the EPC several times you must
do the following:<br><br>
[] Restart the program from the log-in screen (main.htm). <br>
[] Enter a unique email address. <br><br>
If you have any questions regarding this demo, please contact
Tony Carpentiere or Stephen Plotsker at 1 (800) 594-4546 or by<a
href="mailto:tonyc@thinkwaremedia.com">
email.</a></td></tr>
</table><br>
<table width="400" border="0">
<tr><td align="center"><a href="http://205.232.112.21/epc/main.htm"><img src="teleanim2.gif"
border="0" ALT="Click Here"></a></td></tr></table>
</center>
</body>
</html>
<html>
<title>EPC Banner</title>
<head></head>
<body bgcolor="#ffffff">
<center>
<img src="banner.gif"><br><br><br><br>
<table width="400">
<tr><td align="right"><img src="teleanim1.gif"></td>
<td align="left" valign="center"><img src="freetext1.gif"></td></tr>
<tr><td> </td><td> </td></tr>
<tr><td> </td><td> </td></tr>
<tr><td> </td><td align="right"><a href="epctext.html"><img src="click.gif" border="0"
ALT="Click Here"></a></td></tr></table>
</center>
</body>
</html>
```

It should be understood that numerous modifications can be made in the preferred and exemplary embodiments of the invention without deviating from the broader aspects thereof. For example, while the preferred form of the invention is one where software is used as the principal control means for carrying out the steps and functions of the method and the apparatus aspects of the invention, hardware means could be substituted for all or parts thereof

We claim:

1. An internet system method of giving a reward of free telephone call minutes to a potential customer or client accessing a reward-giving web site's software from manually operable means of a customer's or client's user station; each reward-giving web site having a data base accessible by this software and which has stored therein a reward message including the number of free telephone call minutes if a reward is to be given and at least one reward denial message with the reason given that the reward was previously given, and various inquiries relevant to a given customer or client category; each user station having manually operable means to address a selected web site and to send inquiry answers to the web site and a display unit, said display unit having a display screen with a telephone calling card information-receiving area thereon and means for printing out at least said information-receiving area thereof to form a calling card, said method comprising the steps of:

when the user properly accesses the web site the web site's software automatically sending to the accessing user's display unit screen the accessed web site's appropriate data base stored inquiries which include an inquiry for the user's identification including at least the name and address of the user; and in response to the inquiry answers sent to the web site by the user if the reward is to be given, the web site obtaining automatically under software control an available pin number and telephone access number and automatically immediately transmitting the same and the number of free telephone minutes to be rewarded from said data base to said telephone card information-receiving area of said user station display unit screen, and the web site recording in the web site data base that a reward has been given to the user involved for answering the inquiries involved, and if the data base stored information indicates that a reward was previously given for answering these inquiries under software control immediately transmitting said reward refusal message to the user's station display unit screen.

2. The internet system method of claim 1 wherein said reward giving web site data base includes reward messages for rewarding different numbers of free telephone calling minutes depending upon the web site accessing customer or client category; and the method including the step of sending a reward message selected from the web site data base with the number of free telephone call minutes corresponding to the customer or client category indicated on the received category inquiry answer.

3. The internet system method of claim 1 wherein said reward giving web site data base includes inquiries identifying different customer or client categories and different informational messages specifically designed for the different customer or client categories; and the method including the step of sending to the user's display unit screen the informational message corresponding to the customer or client category indicated on the received category inquiry answer.

4. The internet method of claim 3 wherein there is an audio message corresponding to each pin number which is stored in the telephone company's data base; and when the user uses the assigned pin and telephone access numbers to make a free telephone call the telephone company plays back the associated audio message stored in its data base to the user.

5. The internet system method of claim 1 wherein the reward-giving web site is operated by a pharmaceutical company and the user is expected to be potential patients or doctors, said inquiries stored in the web site data base including (a) inquiries whose answers identify whether the user station was that of a doctor or patient, (b) inquiries asking a potential patient to identify a medical problem of the patient treatable by an identified product sold by the web site's pharmaceutical company, and (c) inquiries asking the doctor if he or she ever recommended the identified product; and said web site data base site having different messages which give patient or doctor-type information relating to such identified product; and said web site sending the appropriate product informational message to the user's station display unit screen depending on whether the user is a doctor or patient needing information on said product.

6. The internet system method of claim 1 wherein the user station manually operable means includes a mouse; and the web site data base contains data for sequentially sending initial, intermediate and final messages upon a mouse click request, the initial message being an acknowledgment that the web site has been accessed and that free telephone call minutes are only a click or so away and indicating a click location, an intermediate message including a click location and a message which includes said client or customer category and other inquiries, and said final messages being if a reward message one including the number of free telephone minutes, the pin and telephone access numbers if not previously given, and where applicable an informational message especially suited to the client category involved, and if an award refusal message it being one which gives the reason for the award refusal; and the method including the steps of sending sequentially the appropriate initial, intermediate and final messages depending on the answers given by the user station to said inquiries.

7. The internet system method of claim 1 wherein the web site software generated inquiries sent to the accessing user's display unit includes inquiries about a particular problem which the accessing user may have, and at least when a reward is to be given to an accessing user the reward-giving web site sends to the display unit of the accessing user station information on a product or service offered by the web site company to aid in solving the problem involved.

8. The internet system method of claim 1 wherein the web site's stored inquiries include an inquiry whether the user has or has not a free calling card and if so the pin number thereof, and in response to the inquiry answers sent to the web site by the user if a reward is to be given to a user already having a calling card sending the new added free calling card minutes thereto.

9. An internet system for giving a reward of free telephone call minutes to a potential customer or client user station accessing a reward-giving web site's software; said system including at least one reward-giving web site having a data base accessible by this software and which has stored therein various inquiries including a customer or client identification inquiry including at least the customer's or client's name and address and messages including at least a reward message of the number of free telephone minutes to be rewarded and the pin and telephone access numbers involved, and least one reward denial message which includes the fact that the denial is based on the fact that a reward was previously given for answering the inquiries involved; each user station having a manually operable means to address a selected web site and send thereto answers to web site inquiries and a display unit, said display unit having a display screen with a telephone card information-receiving area thereof to form when printed out a calling card, said internet system further comprising:

first means including software at the web site responsive to receipt of initial access signals from said user station manually operable means for automatically sending to the accessing user's display unit the accessed web site's appropriate data base stored inquiries and which include an inquiry for the user's identification including at least the name and address of the user and other information to identify the customer or client category involved;

said web site software including software means responsive to the inquiry answers sent thereto by the user by operation of said manually operable means and to the absence in said data base of information that the user has been given a reward before for answering the inquiries involved for obtaining said reward message from said data base and for transmitting the same to said telephone calling card information-receiving area of said user station display unit screen and for recording that a reward has been given to the user involved in the web site's data base;

and said web site software including software means responsive to web site data base stored information indicating that a reward was previously given for answering the inquiries involved by transmitting said data base stored reward refusal message to the accessing user's station display unit screen.

10. The internet system of claim 9 wherein said reward giving web site data base includes reward messages for rewarding different numbers of free telephone call minutes depending upon the web site accessing customer or client category; and said web site software including software means responsive to the category inquiry answers for sending a reward message selected from the web site data base with the number of free telephone call minutes corresponding to the indicated customer or client category.

11. The Internet system of claim 9 wherein said reward giving web site data base includes inquiries identifying different customer or client categories and different informational messages specifically designed for the different customer or client categories; and the web site software including software means responsive to the category inquiry answer transmitted to the web site by the user for sending to the user display unit the informational message corresponding to the customer or client category indicated on the received category inquiry answer.

12. The internet method of claim 11 wherein there is an audio message corresponding to each pin number which is stored in the telephone company's data base; and when the user uses the assigned pin and telephone access numbers to make a free telephone call the telephone company includes means for playing back the associated audio message stored in its data base to the user.

13. The internet system of claim 9 wherein the reward-giving web site is operated by a pharmaceutical company and the user is expected to be a patient or doctor, said inquiries stored in the web site data base including (a) inquiries whose answers identify whether the user station was that of a doctor or patient, (b) inquiries asking a potential patient to identify a medical problem of the patient treatable by an identified product sold by the web site's pharmaceutical company, and (c) inquiries asking the doctor if he or she ever recommended the identified product; and said web site data base site having different messages which give patient or doctor-type information relating to such identified product; and said web site software means being adapted to send the appropriate product informational message to the user's station display unit screen depending on whether the user is a doctor or patient needing information on said product.

14. The internet system of claim 9 wherein the user station manually operable means includes a mouse; and the web site data base contains data for sequentially sending initial, intermediate and final messages upon a mouse click request, the initial message being an acknowledgment that the web site has been accessed and that free telephone call minutes are only a click or so away and indicating a click location, an intermediate message including a click location and a message which includes said client or customer category and other inquiries, and said final messages being if a reward message one including the number of free telephone minutes, the pin and telephone access numbers if not previously given, and where applicable an informational message especially suited to the client category involved, and if an award refusal message it being one which gives the reason for the award refusal; and the web site software including software means for sending sequentially the appropriate initial, intermediate and final messages depending on the answers given by the user station to said inquiries.

15. The internet system of claim 9 wherein the web site software inquiries sent to the accessing user's display unit includes inquiries about a particular problem which the accessing user may have, and at least when a reward is to be given to a patient accessing user the web site software send to the display unit of the accessing user's station information on a product or service of the company to aid in solving the problem involved.

16. The internet system of claim 9 wherein the web site's stored inquiries include an inquiry whether the user has or has not a free calling card and if so the pin number thereof, and in response to the inquiry answers sent to the web site by the user if a reward is to be given to a user already having a calling card said web site software means sending the new added free calling card minutes to the user station.

17. Computer-readable media containing a computer program that when loaded into a web site's reward-giving computer performs functions for an internet system which is to give a reward of free telephone call minutes to a potential customer or client user accessing this web site's program, each reward-giving web site to have a data base accessible by this program and which has stored therein various inquiries relevant to the customer or client category involved, each user station to have a display unit screen with a telephone calling card information-receiving area thereon and associated with said display unit are means for printing out at least said information-receiving area thereof to form a calling card, and manually operable means to address the reward-giving web site and send thereto answers to be web site transmitted inquiries, said program functions including: responding to receipt at the web site of initial access signals from said user station's manually operable means by automatically sending to the accessing user's display unit the web site's appropriate data base stored inquiries and which include an inquiry for the user's identification including at least the name and address of the user and other information to identify the customer or client category involved; responding to receipt by the web site of inquiry answers sent thereto by the user by operation of said manually operable means by accessing the web site's data base to see if a previous reward was given to the person identified by the inquiry answers which justify denial of a reward and if no previous reward was given, by obtaining an available pin number and telephone access number and immediately sending the pin number only to the E-mail address, if the user has one, and to said information calling card information-receiving area of said display unit screen of the user's display unit if the user has no E-mail address, and in each case to said screen area the number of free telephone minutes and the telephone access number, and recording in the web site data base that a reward has been given to the user involved;

and responding to the web site data base stored information indicating that a reward was previously given by transmitting a reward refusal message to the accessing user's station display unit screen.

18. The computer-readable media of claim 17 designed to add free calling card minutes to an accessing user card when answers to a new set of inquiries indicates that the user had previously received such a card and desires added free minutes, said media program upon the web site's receipt of new inquiry answers indicating that new free minutes are to be rewarded the accessing user sending to the user's display unit the new added free calling card minutes.

19. Software applied to a medium from which the software can be downloaded for use in a data processor at a reward-giving web site in an internet system for giving a reward of free telephone minutes to a potential customer or client user accessing a reward-giving web site's software; each reward-giving web site to have a data base accessible by this software and which has stored therein pin and telephone access numbers and associated free telephone minute rewards which vary in value, a reward-denial message including the reason for the award denial, various inquiries including those asking for the name and at least E-mail address of the potential customer or client involved and others relevant to the customer or client category involved; each user station to have a manually operable means to address a selected web site and send thereto answers to web site inquiries and a display unit, said web site software comprising:

- means responsive to the receipt of initial access signals from said user station manually operable means for automatically sending to the accessing user's station manually operable means for automatically sending to the accessing user's display unit said accessed web site's data base stored inquiries;
- means responsive to the inquiry answers sent thereto by the user by operation of said manually operable means and data based stored data indicating that a reward was not previously given for answering the same inquiries for immediately transmitting to the accessing user's display unit the number of free telephone minutes to be rewarded which can vary depending upon the answers given and for immediately transmitting to one of the display unit and E-mail address, if any, the pin and telephone access numbers involved, and for recording in the web site's data base that a reward has been given to the user for answering the inquiries involved;
- and means responsive to said web site data based stored information indicating that a reward was previously given in response to answering the inquiry involved for transmitting said reward denial message including the reason for such denial to the accessing user's station display unit.

20. An internet system method for adding free telephone call minutes to a telephone calling card of a potential customer or client having a given pin number and telephone access number when the customer or client accesses a reward-giving web site's software from manually operable means of the customer's or client's user station and answers inquiries in a reward-giving manner; each reward-giving web site having a data base accessible by this software and which has stored therein the number of the to be added free telephone call minutes and various inquiries relevant to the customer or client category involved which when answered for the first time will result in the reward of additional telephone call minutes, and the pin numbers for which a reward was given before for the answering of the inquiries involved; each user station having manually operable means to address a selected web site and to send inquiry answers to the web site and a display unit, said method comprising the steps of:

- when the user properly accesses the web site the web site's software automatically sending to the accessing user's display unit screen the accessed web site's appropriate data base stored inquiries which include an inquiry for the user's identification by pin number and access telephone number or otherwise; and
- in response to the correct reward-deserving inquiry answers sent to the web site by the user and the absence of a record that the pin number involved was previously rewarded for answering the inquiries involved the web site obtaining automatically under software control the number of free telephone minutes to be rewarded from said data base and sending to both said user station display screen and the telephone company for entry in the telephone company's records for the pin number and telephone access number involved the added reward minutes, and the web site software also then recording in the web site data base that a reward has been given to the user involved for correctly answering the inquiries involved, and if the data base stored information indicates that a reward was previously given for such answers said software immediately transmitting a reward refusal message to the user's station display unit screen.

21. An internet system for adding a reward of free telephone call minutes to a telephone calling card having already given pin and telephone access numbers when the card holder accesses a reward-giving web site's software; said system comprising:

- at least one such reward-giving web site having a data base accessible by this software and which has stored therein various inquiries relevant to the customer or client category involved and messages including the number of free telephone minutes to be added if a reward is to be given, a reward refusal message if a reward is to be denied, and a record of the pin numbers which have been given rewards before for answering the inquiries involved;
- user stations each having a manually operable means to address a selected reward-giving web site and send thereto answers to web site inquiries and a display unit;
- and said web site's software including means responsive to the receipt of web-site accessing signals generated by said manually operable means of a user station for sending to the accessing user's display unit the accessed web site's appropriate data base stored inquiries which include an inquiry for the user's identification by pin number and access telephone number or otherwise; and means responsive to the correct reward-deserving inquiry answers sent to the web site by the user and the absence in the for sending from said web site data base the number of free telephone minutes to be rewarded to both said user station display unit and the telephone company for entry in the telephone company's records for the pin number and telephone access number involved and for then recording in the web site's data base that a reward has been given to the user involved for correctly answering the inquiries involved, and means responsive to data base information which indicates that a reward was previously given for such answers for immediately transmitting a reward refusal message to the user's station display unit.

22. An internet system for giving a reward of free telephone call minutes to potential patients and physicians user stations which can access a reward-giving web site's software of a pharmaceutical company selling a given product to treat a given ailment; said system comprising:

- a reward-giving web site having said software and a data base accessible by this software and which has stored therein various inquiries including (a) user identifying inquiries asking for the name and address of the user and whether the user is a patient or a physician, and (b) user ailment and ailment-treating product using inquiries;
- said data base also having stored therein or otherwise automatically accessible (c) pin and telephone access numbers and associated numbers of free telephone minutes to be given to patient's who for the first time answer the inquiry involved or to physicians who for the first time answer the inquiry involved, (d) different appropriate informational messages about said product respectively for patients with and physicians who treat such ailment, and (e) a reward refusal message and the reason therefor if a reward is to be denied;

each user station having a manually operable means to address a selected web site and send thereto answers to web site inquiries and a display unit;

said web site software including means responsive to the receipt of initial web site-accessing signals generated upon operation of said user station manually operable means for automatically accessing said data base and sending to the accessing user's display unit said inquiries;

said web site software including means responsive to the inquiry answers sent thereto by the user by operation of said manually operable means and to the absence in said data base of information that the user has been given a reward before for answering the inquiries involved by obtaining the appropriate available pin and telephone access numbers and the number of free telephone minutes to be rewarded and for transmitting at least the number of free telephone minutes to be rewarded to the user's display unit and the pin number and telephone access number to one of the user station's display unit and the user's E-mail address if the user has an E-mail address, for transmitting the appropriate ailment-treating information to the user station's display unit and for recording in said data base that a reward has been given to the user involved for answering said inquiries;

and said web site software including means responsive to web site data base stored information indicating that a reward was previously given for answering said inquiries by transmitting said reward refusal message to the accessing user's station display unit.

23. The internet system of claim 22 wherein the website's data base has stored therein reward information where some pin numbers have relatively small numbers of free telephone minutes to be given deserving potential patients and much larger number of free telephone minutes to be rewarded deserving physicians.

24. Computer-readable media containing a computer program that when loaded into a web-site's reward-giving computer performs functions for an internet system where a pharmaceutical company selling a given product to treat a given ailment can give through its web site a reward of free telephone minutes to a potential patient or physician answering given inquiries from a user station having manually operable means to communicate with said web site and a display unit to display inquiries and information sent thereto from said web site, said web site to have a data base accessible by said software and which has stored therein various inquiries including (a) user identifying inquiries asking for the name and address of the user and whether the user is a patient or physician, and (b) user ailment and ailment-treating product information for said ailment; said data base also having stored therein or otherwise automatically accessible (c) pin and telephone access numbers and associated numbers of free telephone minutes to be given to patient's who for the first time answer the inquiry involved or to physicians who for the first time answer the inquiry involved, (d) different appropriate informational messages for patients and doctors about said product and (e) a reward refusal message and the reason therefor if a reward is to be denied; said program functions including:

responding to the receipt of initial web site-accessing signals generated upon operation of said user station manually operable by automatically accessing said data base and sending to the accessing user's display unit said inquiries;

responding to the inquiry answers sent thereto by the user by operation of said manually operable means and to the absence in said data base of information that the user has been given a reward before for answering the inquiries involved by obtaining the appropriate available pin and telephone access numbers and the number of free telephone minutes to be rewarded, for transmitting at least the number of free telephone minutes to be rewarded to the user's display unit and the pin number and telephone access number to one of the display unit and the user's E-mail address if the user has an E-mail address, for transmitting to the user's display unit the appropriate informational message about said product, and for recording in said data base that a reward has been given to the user involved for answering said inquiries;

and responding to said web site data base stored information indicating that a reward was previously given for answering said inquiries by transmitting said reward refusal message to the accessing user's station display unit.

25. The computer-readable media of claim 24 wherein said web site has immediately available in said data base or otherwise the DEA numbers of all physicians in a given operating area, said inquiries including one asking for the user's DEA number if a physician is the user, said software functions include checking if the user physician's DEA number is listed for the user as a condition for sending said reward message and if not sending to the physician's user station's display unit a reward denial message which indicates that a reward is being refused for this reason.

26. An internet system for giving a reward of free telephone call minutes to a potential customer's or client's user station accessing a reward-giving web site's software; said system comprising:

a reward-giving web site having said software and a data base accessible by this software and which has stored therein various inquiries including (a) user identifying inquiries asking for the name and address of the user, and (b) user and user ailment category identifying inquiries asking whether the user is a patient and if so to identify an ailment of concern or is a physician and if so whether he or she is familiar with said product and the ailment to be treated thereby;

said data base also having stored therein or otherwise automatically accessible (c) pin and telephone access numbers and associated numbers of free telephone minutes to be given to patient's who for the first time answer the inquiry involved or to physicians who for the first time answer the inquiry involved, (d) messages which identify and give information about the company's product, if any, which treats the ailment involved and (e) a reward refusal message and the reason therefor if a reward is to be denied;

each user station having a manually operable means to address a selected web site and send thereto answers to web site inquiries and a display unit;

said web site software including means responsive to the receipt of initial web site-accessing signals generated upon operation of said user station manually operable means for automatically accessing said data base and sending to the accessing user's display unit said inquiries;

said web site software including means responsive to the inquiry answers sent thereto by the user by operation of said manually operable means and to the absence in said data base of information that the user has been given a reward before for answering the inquiries involved by obtaining the appropriate available pin and telephone access numbers and the number of free telephone minutes to be rewarded and for transmitting at least the number of free telephone minutes to be rewarded to the user's display unit and the pin number and telephone access number to one of the display unit and the user's E-mail address if the user has an E-mail address and for recording in said data base that a reward has been given to the user involved for answering said inquiries;

and said web site software including means responsive to web site data base stored information indicating that a reward was previously given for answering said inquiries by transmitting said reward refusal message to the accessing user's station display unit.

27. The internet system of claim 26 where said web site has automatic access to numbers which identify physician or other possible other professional users, and said web site software sending rewards to the user's display unit only when the user is such a professional user and said web site station's accessible number involved correspond.

28. An internet system method for giving a reward of free telephone call minutes to a potential customer's or client's user station accessing a reward-giving web site's software, said web site having a data base accessible by this software and which has stored therein various inquiries including (a) user identifying inquiries asking for the name and address of the user, and (b) user category identifying inquiries asking whether the user is one of a number of different user types who could be interested in certain products or services offered by the web site owner, said web site data base also having stored therein or otherwise automatically accessible information on (c) the pin and telephone access numbers and associated numbers of free telephone minutes and audio messages relevant to the user category involved to be given to users who for the first time answers the inquiries involved, (d) messages which identify and give information about the company's product or services which could match the interests of the user category involved, and (e) a reward refusal message and the reason therefor if a reward is to be denied; there being a telephone company data base which has stored therein said pin and telephone access numbers and the associated number of free telephone minute rewards and audio messages which are to be sent to the user when he or she places a telephone call using the associated pin and telephone access numbers; and there being a user station having a manually operable means to address a selected web site and send thereto answers to web site inquiries and a display unit; said method comprising the steps of:

when the user properly accesses said web site software the software thereof automatically accessing said data base and sending to the accessing user's display unit said inquiries;

in response to the inquiry answers sent to the web site by the user if the web site data base indicates that a reward was not previously given to the user for answering the inquiries involved the web site obtaining automatically from the data base under software control the appropriate available pin and telephone access numbers and the number of free telephone minutes to be rewarded and for transmitting at least the number of free telephone minutes to be rewarded to the user's display unit and the pin number and telephone access number to one of the display unit and the user's E-mail address if the user has an E-mail address and for recording in said data base that a reward has been given to the user involved for answering said inquiries;

and if the web site data base stored information indicates that a reward was previously given for answering the inquiries involved under data base software control transmitting said reward refusal message and the reason therefor to the accessing user's station display unit;

and when said rewarded user initiates a telephone call using said rewarded pin and telephone access numbers the telephone company send to the user said recorded message associated with said pin number.

29. An internet system for giving a reward of free telephone call minutes to a potential customer's or client's user station accessing a reward-giving web site's software; said system comprising:

a reward-giving web site having said software and a data base accessible by this software and which has stored therein various inquiries including (a) user identifying inquiries asking for the name and address of the user and whether the user is a patient or physician, and (b) user ailment and ailment-treating product information inquiries;

said web site data base also having stored therein or otherwise automatically accessible information on (c) the pin and telephone access numbers and associated numbers of free telephone minutes and audio messages relevant to the user category involved to be given to users who for the first time answers the inquiries involved, (d) different appropriate informational messages about said product, and (e) a reward refusal message and the reason therefor if a reward is to be denied;

a telephone company data base which has stored therein said pin and telephone access numbers and the associated number of free telephone minute rewards and audio messages which are to be sent to the user when he or she places a telephone call using the associated pin and telephone access numbers;

a user station having a manually operable means to address a selected web site and send thereto answers to web site inquiries and a display unit;

web site software including means responsive to the receipt of initial web site-accessing signals generated upon operation of said user station manually operable means for automatically accessing said data base and sending to the accessing user's display unit said inquiries;

said web site software further including means responsive to the inquiry answers sent thereto by the user by operation of said manually operable means and to the absence in said data base of information that the user has been given a reward before for answering the inquiries involved by obtaining the appropriate available pin and telephone access numbers and the number of free telephone minutes to be rewarded and for transmitting at least the number of free telephone minutes to be rewarded to the user's display unit and the pin number and telephone access number to one of the display unit and the user's E-mail address if the user has an E-mail address, for transmitting to said user display unit the appropriate ailment treating product informational message, and for recording in said data base that a reward has been given to the user involved for answering said inquiries;

said web site software including means responsive to web site data base stored information indicating that a reward was previously given for answering said inquiries by transmitting said reward refusal message and reason therefor to the accessing user's station display unit.

* * * * *